US012539280B2

(12) United States Patent
Mullen

(10) Patent No.: US 12,539,280 B2
(45) Date of Patent: Feb. 3, 2026

(54) ORAL THIN FILMS

(71) Applicant: University of Strathclyde, Glasgow (GB)

(72) Inventor: Alexander Balfour Mullen, East Kilbride (GB)

(73) Assignee: UNIVERSITY OF STRATHCLYDE, Glasgow (GB)

( * ) Notice: Subject to any disclaimer, the term of this patent is extended or adjusted under 35 U.S.C. 154(b) by 411 days.

(21) Appl. No.: 17/311,153

(22) PCT Filed: Dec. 6, 2019

(86) PCT No.: PCT/GB2019/053452
§ 371 (c)(1),
(2) Date: Jun. 4, 2021

(87) PCT Pub. No.: WO2020/115497
PCT Pub. Date: Jun. 11, 2020

(65) Prior Publication Data
US 2022/0016044 A1 Jan. 20, 2022

(30) Foreign Application Priority Data
Dec. 7, 2018 (GB) .................................. 1819978

(51) Int. Cl.
| | | |
|---|---|---|
| *A61K 9/70* | (2006.01) | |
| *A61K 9/00* | (2006.01) | |
| *A61K 31/166* | (2006.01) | |
| *A61K 31/196* | (2006.01) | |
| *A61K 31/4045* | (2006.01) | |
| *A61K 31/48* | (2006.01) | |
| *A61K 31/485* | (2006.01) | |
| *A61K 31/66* | (2006.01) | |
| *A61K 33/42* | (2006.01) | |
| *A61K 47/58* | (2017.01) | |

(52) U.S. Cl.
CPC ............ *A61K 9/7007* (2013.01); *A61K 9/006* (2013.01); *A61K 31/166* (2013.01); *A61K 31/196* (2013.01); *A61K 31/4045* (2013.01); *A61K 31/485* (2013.01); *A61K 33/42* (2013.01)

(58) Field of Classification Search
CPC .... A61K 9/7007; A61K 9/006; A61K 31/166; A61K 31/196; A61K 31/4045; A61K 31/485; A61K 33/42; A61K 47/585; A61K 9/0056
See application file for complete search history.

(56) References Cited

U.S. PATENT DOCUMENTS

| | | | |
|---|---|---|---|
| 7,067,116 B1 | 6/2006 | Bess et al. ................... | 424/78.1 |
| 8,765,178 B2* | 7/2014 | Parikh ..................... | A61P 43/00 424/468 |
| 9,107,921 B2* | 8/2015 | Giliyar ..................... | A61P 11/00 |
| 2014/0271787 A1* | 9/2014 | Bogue ................... | A61K 9/7007 424/443 |
| 2015/0064231 A1* | 3/2015 | Li .......................... | A61K 45/06 424/443 |
| 2019/0196907 A1 | 6/2019 | Khan et al. ................... | 424/439 |

FOREIGN PATENT DOCUMENTS

| | | |
|---|---|---|
| WO | WO/2001/070194 | 9/2001 |
| WO | WO/2006/047365 | 5/2006 |
| WO | WO/2008/040534 | 4/2008 |
| WO | WO/2009/099830 | 8/2009 |
| WO | WO/2013/171146 | 11/2013 |
| WO | WO/2015/001541 | 1/2015 |
| WO | WO/2018/156214 | 8/2018 |

OTHER PUBLICATIONS

Dvořáčková et al. AAPS PharmSciTech, vol. 14, No. 4, Dec. 2013. (Year: 2013).*
Ahmed, A. et al., (2010) "Use of sustained release oral morphine as a bridge in withdrawal of morphine in patients on high doses of oral immediate release morphine for cancer pain," *Am. J. Hosp. Palliat. Care* 27(6), 413-415.
Amabile, C. M. and Bowman, B. J., (2006) "Overview of oral modified-release opioid products for the management of chronic pain," *Ann Pharmacother* 40(7-8), 1327-1335.
British Pharmacopoeia Commission, (2014) "Appendix XII B. Annex: Recommendations on Dissolution Testing," London, England.
Currow, D. C. et al., (2011) "Once-Daily Opioids for Chronic Dyspnea: A Dose Increment and Pharmacovigilance Study," *J. Pain Symptom Manage.* 42(3), 388-399.
Dixit, R. P. and Puthli, S. P., (2009) "Oral strip technology: Overview and future potential," *Journal of Controlled Release* 139(2), 94-107.
Dudgeon, D. J. et al., (2001) "Dyspnea in Cancer Patients: Prevalence and Associated Factors," *J. Pain Symptom Manage.* 21(2), 95-102.
Fabiano, V. et al., (2011) "Paediatric pharmacology: Remember the excipients," *Pharmacol. Res.* 63(5), 362-365.
Lass, J. et al., (2012) "Hospitalised neonates in Estonia commonly receive potentially harmful excipients," *BMC Pediatr.* 12(1), 136.
Lee, G. and Sabra, K., (2006) "Stability of morphine sulphate in ANAPA Plus ambulatory infusion device and PEGA infusion sets," *European Journal of Hospital Pharmacy* 12, 76-80.

(Continued)

*Primary Examiner* — Mina Haghighatian
(74) *Attorney, Agent, or Firm* — Medlen & Carroll, LLP

(57) ABSTRACT

An orally dissolvable film includes at least one layer comprising a first pharmaceutically active ingredient; a resinate comprising an ion exchange resin and a second pharmaceutically active ingredient; and a matrix and/or binder. The provision of a first pharmaceutically active ingredient, e.g., dispersed or dissolved in the film, and of a resinate comprising an ion exchange resin and a second pharmaceutically active ingredient, may allow immediate release of the first active ingredient, and controlled, sustained and/or delayed release of the second active ingredient.

19 Claims, 7 Drawing Sheets

(56) References Cited

OTHER PUBLICATIONS

Figure 1:
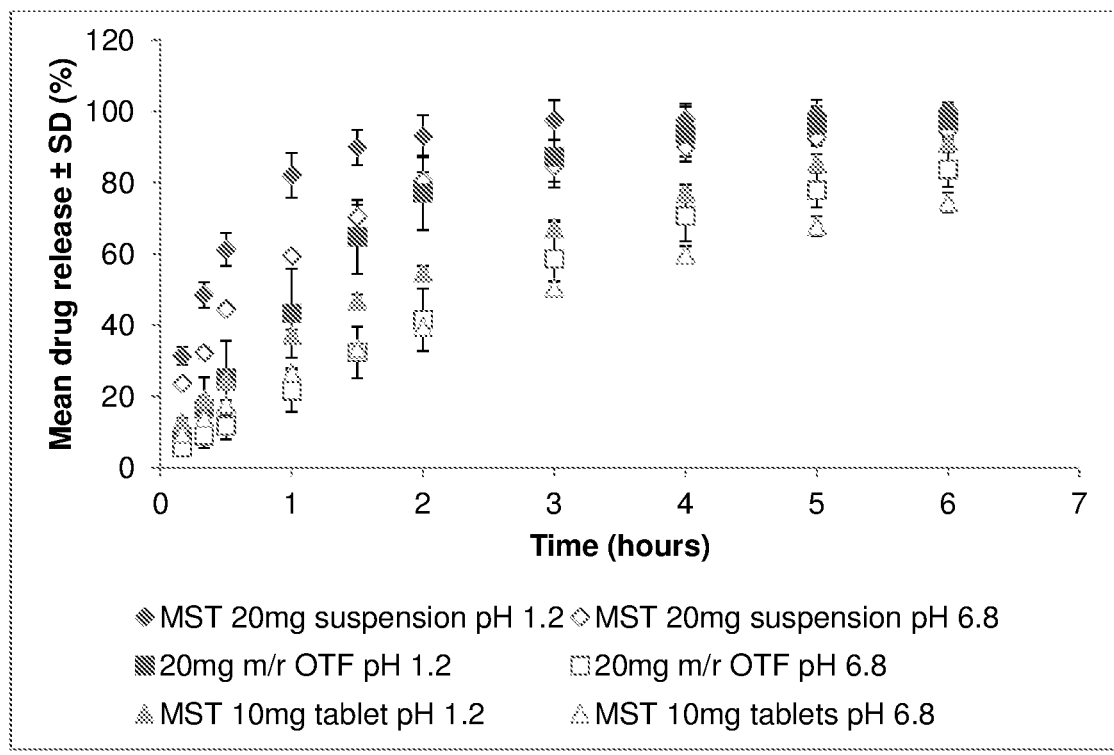

Mahdy, T. et al., (2012) "New HPLC Method to Detect Individual Opioids (Heroin and Tramadol) and their Metabolites in the Blood of Rats on Combination Treatment," *J. Chromatogr. Sci.* 50(8), 658-665.

Nakamura, K. et al., (2007) "Pharmacokinetic and Pharmacodynamic Evaluations of Novel Oral Morphine Sustained Release Granules," *Biol. Pharm. Bull.* 30(8), 1456-1460.

Rathbone, J. H. and Robe, M. S., (2002) "Recent advances and future directions in modified-release delivery systems for oral administration," in *Modified-Release Drug Delivery Technology*, pp. 79-96, Taylor & Francis.

Shamma, R. N. et al., (2011) "Development and optimization of a multiple-unit controlled release formulation of a freely water soluble drug for once-daily administration," *Int. J. Pharm.* 405(1), 102-112.

Zajicek, A. et al., (2013) "A Report from the Pediatric Formulations Task Force: Perspectives on the State of Child-Friendly Oral Dosage Forms," *AAPS J.* 15(4), 1072-1081.

Zhang, Y. et al., (2010) "DDSolver: an add-in program for modeling and comparison of drug dissolution profiles," *AAPS J.* 12(3), 263-271.

Hughes, L., "New Uses of Ion Exchange Resins in Pharmaceutical Formulation," *Rohm and Haas Research Laboratories—Spring House*.

Ahmed, A. et al. (2010) "Use of sustained release oral morphine as a bridge in withdrawal of morphine in patients on high doses of oral immediate release morphine for cancer pain," *American Journal of Hospice and Palliative Care* 27(6), 413-415.

Amabile, C. M. et al. (2006) "Overview of oral modified-release opioid products for the management of chronic pain," *Ann Pharmacother* 40(7-8), 1327-1335.

Arya, A. et al. (2010) "Fast dissolving oral films: An innovative drug delivery system and dosage form," *International Journal of ChemTech Research* 2, 576-583.

Bala, R. et al. (2013) "Orally dissolving strips: A new approach to oral drug delivery system," *International journal of pharmaceutical investigation* 3(2), 67-76.

Currow, D. C. et al. (2011) "Once-Daily Opioids for Chronic Dyspnea: A Dose Increment and Pharmacovigilance Study," *Journal of Pain and Symptom Management* 42(3), 388-399.

Dixit, R. P. et al. (2009) "Oral strip technology: Overview and future potential," *Journal of Controlled Release* 139(2), 94-107.

Dudgeon, D. J. et al. (2001) "Dyspnea in Cancer Patients: Prevalence and Associated Factors," *Journal of Pain and Symptom Management* 21(2), 95-102.

Fabiano, V. et al. (2011) "Paediatric pharmacology: Remember the excipients," *Pharmacological Research* 63(5), 362-365.

Hughes, L. "New Uses of Ion Exchange Resins in Pharmaceutical Formulation," *Rohm and Haas Research Laboratories—Spring Hlouse*.

Lass, J. et al. (2012) "Hospitalised neonates in Estonia commonly receive potentially harmful excipients," *BMC Pediatrics* 12(1), 136.

Mahdy, T. et al. (2012) "New HPLC Method to Detect Individual Opioids (Heroin and Tramadol) and their Metabolites in the Blood of Rats on Combination Treatment," *Journal of Chromatographic Science* 50(8), 658-665.

Mahore, J. G. et al. (2010) "Ion Exchange Resins: Pharmaceutical Applications and Recent Advancement," *International Journal of Pharmaceutical Sciences Review and Research* 1(2).

Nakamura, K. et al. (2007) "Pharmacokinetic and Pharmacodynamic Evaluations of Novel Oral Morphine Sustained Release Granules," *Biological and Pharmaceutical Bulletin* 30(8), 1456-1460.

Rathbone, J. H. et al. (2002) "Recent advances and future directions in modified-release delivery systems for oral administration," in *Modified-Release Drug Delivery Technology*, Taylor & Francis.

Shamma, R. N. et al. (2011) "Development and optimization of a multiple-unit controlled release formulation of a freely water soluble drug for once-daily administration," *International Journal of Pharmaceutics* 405(1), 102-112.

The Dow Chemical Company. (2006) The advantages of uniform particle sized ion exchange resins, (The Dow Chemical Company, Ed.), the Dow Chemical Company, Edegem, Belgium.

Zajicek, A. et al. (2013) "A Report from the Pediatric Formulations Task Force: Perspectives on the State of Child-Friendly Oral Dosage Forms," *AAPS Journal* 15(4), 1072-1081.

Zhang, Y. et al. (2010) "DDSolver: an add-in program for modeling and comparison of drug dissolution profiles," *AAPS Journal* 12(3), 263-271.

PCT International Search Report of International Application No. PCT/GB2019/053452 dated Feb. 20, 2020.

Great Britain Office Action for the Great Britain Patent Application No. GB1819978.6 dated May 30, 2019.

\* cited by examiner

ORAL THIN FILMS

FIELD OF THE INVENTION

The present invention relates to a drug delivery system, and in particular, to a drug delivery system in the form of an oral thin film.

BACKGROUND TO THE INVENTION

Many medical and/or pathological conditions require administration of chemical and/or pharmaceutical substances or drugs to a subject. An example of a common application requiring the delivery of a drug is the treatment of pain.

It is generally recognised that administration of morphine is the 'gold standard' treatment for severe pain. It continues to be recommended by national (UK) health organisations and by the World Health Organisation (WHO) as the first line treatment choice for severe pain in advanced cancer in adults (Scottish Intercollegiate Guidelines Network, Control of pain in adults with cancer. SIGN Guideline No. 106, SIGN, Edinburgh, 2008) and for children with persistent moderate to severe pain due to medical illness (World Health Organization, WHO Guidelines on the Pharmacological Treatment of Persisting Pain in Children with Medical Illnesses, World Health Organization, Geneva, 2012).

As well as its application as an analgesic in moderate- to severe pain, morphine is commonly used in the treatment of breathlessness as part of palliative care with around half of general cancer sufferers experiencing dyspnoea as a symptom (D. J. Dudgeon, L. Kristjanson, J. A. Sloan, M. Lertzman, K. Clement, Dyspnea in cancer patients; prevalence and associated factors, J Pain Symptom Manag, 21 (2001) 95-102). The off-label use of low dose opioids such as morphine for the treatment of dyspnoea in chronic heart failure is also recommended within national guidelines as part of palliative treatment (SIGN, Management of chronic heart failure. SIGN Guideline No. 95, SIGN, Edinburgh, 2007). Morphine administered as a modified release preparation has also been suggested in chronic heart failure (D. C. Currow, C. McDonald, S. Oaten, B. Kenny, P. Allcroft, P. Frith, M. Briffa, M. J. Johnson, A. P. Abernethy, Once-daily opioids for chronic dyspnea: a dose increment and pharmacovigilance study, Journal of Pain and Symptom Management, 42 (2011) 388-399). Prolonged release oral morphine preparations have also been demonstrated to be of benefit in the discontinuation of high dose morphine since they are able to maintain a steady blood concentration, thus avoiding withdrawal symptoms (A. Ahmed, H. Khurana, V. Gogia, S. Mishra, S. Bhatnagar, Use of sustained release oral morphine as a bridge in withdrawal of morphine in patients on high doses of oral immediate release morphine for cancer pain, The American journal of hospice & palliative care, 27 (2010) 413-415). The convenience of twice daily dosing with many sustained release oral morphine products encourages patient compliance whilst also sustaining blood levels, enabling better pain management and control of symptoms (C. M. Amabile, B. J. Bowman, Overview of oral modified-release opioid products for the management of chronic pain, The Annals of pharmacotherapy, 40 (2006) 1327-1335).

Available licensed oral dosage forms of morphine have their limitations, however. Solid forms such as tablets (Sevredol®, Morphgesic®, MST® Continus®) or capsules (Zomorph®, MXL®) can be problematic for patients with swallowing difficulties. Dysphagia is a common problem amongst palliative patients, and an important aspect of end of life care. Paediatric populations too have more difficulty swallowing solid oral dosage forms; the European Medicines Agency do not consider tablets/capsules acceptable or applicable to children under the age of 2 (Committee for medicinal products for human use (CHMP), Reflection paper: formulations of choice for the paediatric population, in, 2006). Children aged 2-6 have variable acceptability which depends on development as well as tablet size (A. Zajicek, M. J. Fossler, J. S. Barrett, J. H. Worthington, R. Ternik, G. Charkoftaki, S. Lum, J. Breitkreutz, M. Baltezor, P. Macheras, M. Khan, S. Agharkar, D. D. MacLaren, A report from the pediatric formulations task force: perspectives on the state of child-friendly oral dosage forms, AAPS J, 15 (2013) 1072-1081). Oral liquids (Oramorph®) can be helpful in some dysphagic patients but require accurate measurement of volumes. In paediatrics, the lack of age appropriate licensed drug formulations has led to the widespread off-label use of adult medicines in children. The need for measurement of very small volumes of concentrated liquid preparations or dilution or reconstitution of available products can result in inaccurate dosing in this population. In addition, many liquid drug formulations e.g. Oramorph® require the inclusion of excipients such as alcohols or preservatives, which can have undesirable or toxic effects in paediatric patients (V. Fabiano, C. Mameli, G. V. Zuccotti, Paediatric pharmacology: remember the excipients, Pharmacol Res, 63 (2011) 362-365). MST® Continus® (Napp Pharmaceuticals Ltd.; Cambridge) is available as granules for reconstitution as a suspension for modified release administration of morphine. Although an attractive twice daily preparation, this formulation again requires additional manipulation prior to administration. The manufacturer's instructions advise dispersion of the granules in at least 10-30 mL of water (Napp Pharmaceuticals Limited, MST Continus suspensions 20, 30, 60, 100 and 200 mg—Summary of Product Characteristics (SPC), in: electronic Medicines Compendium (eMC), 2014). For smaller doses e.g. in paediatrics, smaller aliquots may be required, however not only would this would rely on accurate measurement of small volumes, sedimentation or non-uniform suspension of the granules could result in dose inaccuracy. For these reasons, there is a continued need for innovative formulation strategies to deliver morphine more effectively.

In order to optimise the blood concentration-time profiles and/or reduce the frequency of dosing of some drugs with short half-lives such as morphine, formulators have sought to develop novel technologies which delay or prolong drug release from dosage forms within the gastrointestinal tract. Some examples include the capture of drugs within slowly dissolving matrices, addition of coatings to tablets with pH dependent solubility, and osmotically controlled systems which use semipermeable membranes to control drug release (M. J. Rathbone, J. Hadgraft, M. S. Roberts, Recent advances and future directions in modified-release delivery systems for oral administration, in: Modified-Release Drug Delivery Technology, Taylor & Francis, 2002).

A known method of administering a substance orally to a patient is by the use of an Oral Thin Film ('OTF'). The term "Oral Thin Film" is a term known in the art, and the term "thin" will not be understood as a relative term, but merely as part of the recognised phrase "Oral Thin Film" which refers to a type of product widely understood by a person of ordinary skill in the art as having a recognised meaning. Other synonymous terms to describe the same type of product are "Oral Dissolvable Films", "Thin Dissolving Films", "Orodispersible Films", "Orally Consumable Films", "Oral Drug Strips" or "Oral Films".

OTFs are films capable of dissolving rapidly in the mouth of a subject, and which are principally composed of water soluble film forming polymer(s). OTFs were first developed as breath fresheners and have progressed towards the oral delivery of active pharmaceutical ingredients (APIs). Approximately the size of a postage stamp, they dissolve quickly in saliva when placed in the mouth of a subject without the need to chew or drink water. These films are formulated using minimal food or pharmaceutical grade excipients and are inexpensive to produce. As an alternative solid platform for drug delivery, they can be formulated without the need for preservatives or solvents; an attractive option for paediatric drug delivery where the administration of liquid formulations can result in exposure to potentially harmful excipients.

Typically, 5-30% drug loading can be achieved with oral thin films and the target drug content can be easily controlled by adjusting the film dimensions (R. P. Dixit, S. P. Puthli, Oral strip technology: overview and future potential, J Control Release, 139 (2009) 94-107). Generally the target surface area of the oral thin film is in the range of 5-20 cm$^2$ to allow for practical dose administration (A. Arya, A. Chandra, V. Sharma, K. Pathak, Fast dissolving oral films: an innovative drug delivery system and dosage form, Int J ChemTech Res, 2 (2010) 576-583). Film thickness can also be easily controlled. Numerous different film-forming polymers are available with different disintegration and release rates or even mucoadhesive properties. Many taste masking technologies as well as sweeteners and flavourings can be included to produce an acceptable, palatable drug-delivery system.

Ion exchange resins ('IERs') are water insoluble, polymeric compounds containing either positively or negatively charged sites capable of trapping ions with an opposing charge in an exchange reaction. Through this process, ion exchange resins may be 'loaded' with drug molecules to form drug-resin complexes known as resinates (R. N. Shamma, E. B. Basalious, R. A. Shoukri, Development and optimization of a multiple-unit controlled release formulation of a freely water soluble drug for once-daily administration, International journal of pharmaceutics, 405 (2011) 102-112). Ion exchange resins are available in a range of particle sizes, and exhibit good mechanical strength and physicochemical stability.

PCT Application Publication No. WO 01/70194 (BESS et al.) discloses orally consumable films containing a pharmaceutically active agent and an ion exchange resin used as a taste masking agent for the pharmaceutically active agent.

PCT Application Publication No. WO 2013/171146 (LI) discloses an oral film having a controlled release layer containing an opioid agonist in a resinate, the film having a separate muco-adhesive layer containing an opioid antagonist in order to avoid illicit opiate extraction.

PCT Application Publication No. WO 2009/099830 (BUNICK et al.) discloses an edible film that contains two or more segmented portions and comprises an active ingredient that is distributed on a segmented portion or portions.

The object of the present invention is to obviate or mitigate at least one of the aforementioned problems associated with the prior art.

SUMMARY OF THE INVENTION

According to a first aspect of the invention, there is provided an orally dissolvable film including at least one layer comprising:

a first pharmaceutically active ingredient;
a resinate comprising an ion exchange resin and a second pharmaceutically active ingredient; and
a matrix and/or binder.

The first pharmaceutically active ingredient and the second pharmaceutically active ingredient may be the same or may be different.

The first pharmaceutically active ingredient may be provided or applied, e.g. imprinted, coated, spread, or the like, on the film, e.g. on a surface thereof. The first pharmaceutically active ingredient may be provided or incorporated, e.g. absorbed, dispersed, or dissolved, within the film. The first pharmaceutically active ingredient may be homogeneously provided or incorporated, e.g., homogeneously absorbed, dispersed, or dissolved, within the film.

The resinate may be dispersed, e.g. heterogeneously dispersed, in the film, e.g. in the at least one layer.

The first pharmaceutically active ingredient may be provided in the film, e.g. in the at least one layer, in an amount of about 0.1-50 wt. %, e.g., about 1-20 wt %, typically about 2-10 wt. %.

The resinate may be provided in the film, e.g. in the at least one layer, in an amount of about 1-50 wt. %, e.g., typically about 5-20 wt %.

The ratio (by weight) of the second pharmaceutically active ingredient to resin in the resinate may be about 2:1 to 1:5, typically about 1:1 to 1:2, e.g. about 1:1.5.

The film, e.g. the at least one layer, may comprise a matrix and/or binder. Preferably, the film may comprise a polymer matrix. The matrix may be capable of acting as a binder for the remaining ingredients of the film, e.g. at least for the first pharmaceutically active ingredient and the resinate.

Advantageously, the matrix may comprise a dissolvable polymer matrix.

Preferably, the matrix may be capable of dissolving, disintegrating, and/or breaking down, in the mouth of a subject.

Typically, the matrix polymer may comprise a cellulosic polymer and/or derivatives thereof, including for example one or more of synthetic or natural gum, cellulosic derivatives such as cellulose, ethyl cellulose, hydroxyethyl cellulose, hydroxypropyl methyl cellulose, carboxymethyl cellulose, sodium carboxymethyl cellulose, sodium carboxymethylcellulose, hydroxypropylmethyl cellulose, hydroxypropylcellulose, polysaccharides such as pullulan, carrageenan, alginic acid and/or salts thereof, pectin, xanthan gum and/or derivatives thereof, starch and/or derivatives thereof, and the like.

The matrix polymer may comprise a synthetic polymer including for example an acrylic (co)polymer and/or derivative thereof, a polyalkylene glycol, polyvinyl pyrrolidone, polyvinyl alcohol, carboxyvinyl polymers, and/or derivatives thereof.

The skilled person will understood that the matrix may comprise one or more polymers, or combination of polymers, which may be selected to achieve the desired properties for the film to be manufactured, including for example desired mechanical properties such as strength and/or flexibility, and desired rate of dissolution in a subject's mouth.

The provision of a first pharmaceutically active ingredient dispersed or dissolved in the film, e.g. in the at least one layer, and of a resinate comprising an ion exchange resin and a second pharmaceutically active ingredient, may allow immediate release of the first active ingredient, and controlled, sustained and/or delayed release of the second active ingredient. This may be particularly advantageous when a patient requires immediate delivery of a predetermined amount of the first active ingredient, and sustained release of the second active ingredient over a period of time. Such formulations may be ideally suited to patients with swallowing difficulties regarding other solid oral dosage forms such as tablets; for example, paediatric or elderly patients.

The skilled person will understand that the term "immediate release" means that the first pharmaceutically active ingredient is delivered without delay upon dissolution of the film, e.g., in the mouth of the subject. Thus, the term "immediate" will not be understood in an absolute sense, but takes into account the time required for the film to dissolve and release the first pharmaceutically active ingredient, e.g., in the mouth of a subject.

Typically, the film, e.g. the at least one layer, may dissolve in the mouth of a patient in less than one minute, e.g., less than 45 second, preferably in less than 30 seconds.

The first pharmaceutically active ingredient and the second pharmaceutically active ingredient may be the same. In such instance, the orally dissolvable film may include at least one layer comprising:

a first amount of a pharmaceutically active ingredient provided in the at least one layer;

a resinate comprising an ion exchange resin and a second amount of the pharmaceutically active ingredient; and a matrix and/or binder.

The provision of a first amount of a pharmaceutically active ingredient provided, e.g. dispersed or dissolved, in the film, e.g. in the at least one layer, and of a resinate comprising an ion exchange resin and a second amount of the pharmaceutically active ingredient, may allow immediate release of the active ingredient, e.g. of the first amount of the active ingredient, and also controlled and/or delayed release of the active ingredient, e.g. of the second amount of the active ingredient. This may be particularly advantageous when a patient requires immediate delivery of a predetermined amount of the active ingredient, and sustained release of the active ingredient over a period of time. This may, for example, be particularly advantageous in thin films formulated for the treatment of pain, as such a formulation may allow immediate delivery of a predetermined amount of an analgesic, e.g. morphine, to a subject to relieve pain, and also delivery of a resinate providing delayed and/or sustained release of the analgesic, e.g. morphine, to the subject over a period of time. Such formulations may be ideally suited to patients with swallowing difficulties regarding other solid oral dosage forms such as tablets; for example, paediatric or elderly patients.

There may be provided a plurality, e.g., two or more, of pharmaceutically active ingredients in the film, e.g. in the at least one layer. For example, there may be provided a plurality, e.g., two or more, of pharmaceutically active ingredients dispersed in the film, e.g. in the at least one layer.

There may be provided a plurality, e.g., two or more, of resinates. For example, the film, e.g. the at least one layer, may comprise a first resinate comprising a first ion exchange resin and a first pharmaceutically active ingredient, and a second resinate comprising a second ion exchange resin and a second pharmaceutically active ingredient, wherein the first and second pharmaceutically active ingredients are different. There may be provided further pharmaceutically active ingredients each comprising a resinate having an ion exchange resin and a respective pharmaceutically active ingredient.

The term resinate will be herein understood to refer to the combination of a pharmaceutically active ingredient which is bound to or otherwise complexed with an ion exchange resin.

Ion exchange resins are water insoluble, polymeric compounds containing either positively or negatively charged sites capable of trapping ions with an opposing charge in an exchange reaction. Ion exchange resins are typically categorised as cation exchanged resins, or as anion exchange resins. Cation exchange resins are ion exchange resins having negatively charged moieties, and can bind to cations of a pharmaceutically active ingredient, e.g. in solution. The bound cations and associated pharmaceutically active ingredient may then be released subsequently, e.g., in vivo, as the drug reaches equilibrium with the high electrolyte concentrations.

In one embodiment, ion exchange resin may comprise a strong acid cation resin such as a sulfonic-modified styrene-divinylbenzene copolymer resin. Ion-exchange resins may be selected such that the resin may be considered as a safe additive in the production of foods and beverages. For example, the resin may comply with the Code of Federal Regulation (CFR), title 21, part 173 (https://www.gpo.gov/fdsys/pkg/CFR-2010-title21-vol3/pdf/CFR-2010-title21-vol3-sec173-25.pdf). The resin may be selected from one or more of the group consisting of:

Sulfonated copolymer of styrene and divinylbenzene;

Sulfonated anthracite coal meeting the requirements of ASTM method D388-38, Class I, Group 2, "Standard Specifications for Classification of Coal by Rank," which is incorporated by reference (http://www.archives.gov/federal_register/code_of_federal_regulations/ibr_locations.html);

Sulfite-modified cross-linked phenol-formaldehyde, with modification resulting in sulfonic acid groups on side chains;

Methacrylic acid-divinylbenzene copolymer;

Cross-linked polystyrene, first chloromethylated then aminated with trimethylamine, dimethylamine, di-ethylenetriamine, or dimethylethanolamine;

Diethylenetriamine, triethylenetetramine, or tetraethylenepentamine cross-linked with epichlorohydrin;

Cross-linked phenol-formaldehyde activated with one or both of the following: Triethylene, tetramine, and tetraethylenepentamine;

Reaction resin of formaldehyde, acetone, and tetraethylenepentamine;

Completely hydrolyzed copolymers of methyl acrylate and divinylbenzene;

Completely hydrolyzed terpolymers of methyl acrylate, divinylbenzene, and acrylonitrile;

Sulfonated terpolymers of styrene, divinylbenzene, and acrylonitrile or methyl acrylate;

Methyl acrylate-divinylbenzene copolymer containing not less than 2 percent by weight of divinylbenzene, aminolyzed with dimethylaminopropylamine;

Methyl acrylate-divinylbenzene copolymer containing not less than 3.5 percent by weight of divinylbenzene, aminolyzed with dimethylaminopropylamine;

Epichlorohydrin cross-linked with ammonia;

Sulfonated tetrapolymer of styrene, divinylbenzene, acrylonitrile, and methyl acrylate derived from a mixture of monomers containing not more than a total of 2 percent by weight of acrylonitrile and methyl acrylate;

Methyl acrylate-divinylbenzene-diethylene glycol divinyl ether terpolymer containing not less than 3.5 percent by weight of divinylbenzene and not more than 0.6 percent by weight of diethylene glycol divinyl ether, aminolyzed with dimethylaminopropylamine;

Styrene-divinylbenzene crosslinked copolymer, first chloromethylated then aminated with dimethylamine and oxidized with hydrogen peroxide whereby the resin contains not more than 15 percent by weight of vinyl N,N-dimethylbenzylamine-N-oxide and not more than 6.5 percent by weight of nitrogen;

Methyl acrylate-divinylbenzene-diethylene glycol divinyl ether terpolymer containing not less than 7 percent by weight of divinylbenzene and not more than 2.3 percent by weight of diethylene glycol divinyl ether, aminolyzed with dimethyl-aminopropylamine and quaternized with methyl chloride;

Epichlorohydrin cross-linked with ammonia and then quaternized with methyl chloride to contain not more than 18 percent strong base capacity by weight of total exchange capacity;

Regenerated cellulose, cross-linked and alkylated with epichlorohydrin and propylene oxide, then sulfonated whereby the amount of epichlorohydrin plus propylene oxide employed does not exceed 250 percent by weight of the starting quantity of cellulose.

A person of skilled in the art would appreciate that the particular choice of resin to be used for a particular application will depend on the rate of release required for a particular active ingredient or drug, the environment in which the active ingredient or drug is to be released, e.g., enteric release, gastric release, etc, and the chemistry, e.g. charge, of the active ingredient or drug. For example, the ion exchange resin and the active ingredient may be oppositely charged. The ion exchange resin may be selected such that its charge is opposite the charge of the active ingredient. If a negatively charged active ingredient is intended to be used, the ion exchange resin may be a positively charged resin. If a positively charged active ingredient is intended to be used, the ion exchange resin may be a negatively charged resin. If a neutrally charged or neutral active ingredient is intended to be used, the ion exchange resin may be able to bind to or complex with the resin due to a mixture of weaker charges e.g. dipole, or through complexation with resin counter ions.

The first pharmaceutically active ingredient dispersed in the film may be associated with a first release rate.

The first release rate may be at least 30%, e.g. at least 50%, after 5 minutes, when measured at pH 6.8.

The first release rate may be at least 40%, e.g. at least 60%, after 10 minutes, when measured at pH 6.8.

The first release rate may be at least 50%, e.g. at least 60%, after 5 minutes, when measured at pH 1.2.

The first release rate may be at least 60%, e.g. at least 80%, after 10 minutes, when measured at pH 1.2.

The second pharmaceutically active ingredient comprised in the resinate may be associated with a second release rate.

The second release rate may be about 5-80%, e.g. about 10-60%, after 1 hour, when measured at pH 6.8.

The second release rate may be about 10-80%, e.g. about 20-70%, after 2 hours, when measured at pH 6.8.

The second release rate may be about 10-80%, e.g. about 20-60%, after 1 hour, when measured at pH 1.2.

The second release rate may be about 20-90%, e.g. about 30-80%, after 2 hours, when measured at pH 1.2.

The ion exchange resin may typically be provided in the form of beads.

The beads may have an associated particle size, e.g. average size, or associated mesh size.

The mesh size and/or particle size of the ion exchange resin or mixture ion exchange resins may be selected to provide a desired rate of release of the active ingredient or drug.

Without wishing to be bound by theory, it has been observed that the mesh size and/or particle size of the ion exchange resin may affect the rate of release of a given drug under particular conditions. In particular, it has been observed that a drug resinate prepared using a resin having a relatively low mesh size (i.e., relatively high particle size), may provide a lower rate of release than a drug resinate prepared using a resin having a relatively high mesh size (i.e., relatively low particle size).

The resin may have a mesh size in the region of 50-100 mesh size and/or may have a particle size in the region of 150-300 µm. A resinate prepared using such resin may be associated with a relatively low rate of release of the drug or active ingredient.

The resin may have a mesh size in the region of 100-200 mesh size and/or may have a particle size in the region of 74-150 µm. A resinate prepared using such resin may be associated with a medium rate of release of the drug or active ingredient.

The resin may have a mesh size in the region of 200-400 mesh size and/or may have a particle size in the region of 37-74 µm. A resinate prepared using such resin may be associated with a relatively high rate of release of the drug or active ingredient.

The second release rate may be about 10-70%, e.g. about 20-60%, after 1 hour, when measured at pH 1.2, for a resin having a mesh size of about 50-100.

The second release rate may be about 30-99%, e.g. about 50-95%, after 2 hours, when measured at pH 1.2, for a resin having a mesh size of about 200-400.

The ion-change resin and/or resinate may be provided in the form of particles, e.g. beads.

The resinate, e.g. beads, may be processed, e.g. coated, encapsulated or the like. The provision of a coating on the resinate particles may alter, e.g. delay, initial release of the second active ingredient from the resinate. This may be particularly advantageous when the second active ingredient is to be released in a specific area of a subject's anatomy, for example to bypass release within one or more areas of the digestive system, e.g. stomach, and be released in one or more other areas of the digestive system, e.g. intestine. The processing material, e.g. coating, may be selected so as to withstand degradation or dissolution within one or more areas of the digestive system, e.g. stomach, and degrade or dissolve in one or more other areas of the digestive system, e.g. intestine. The provision of a coating on the resinate particles may also be useful to fine-tune the release rate of the second active ingredient from the resinate, for example when the selection of the ion-exchange resin alone does not provide the desired release rate and/or release profile.

In some embodiments, the oral dissolvable film may further comprise optional additives such as one or more of a disintegrating agent, surfactant (e.g., emulsifier), plasticizer, filler, flavouring agent, sweetener, colorant, antioxidant, microbial preservatives, and the like.

The film, e.g. the at least one layer, may further comprise a free or unloaded ion exchange resin. Thus, in an embodiment of the present invention, there may be provided an orally dissolvable film including at least one layer comprising:

a first pharmaceutically active ingredient dispersed in the at least one layer;

a resinate comprising a first ion exchange resin and a second pharmaceutically active ingredient;

a second ion-exchange resin; and a matrix and/or binder.

The first ion-exchange resin and the second ion-exchange resin may be the same or may be different.

The second ion-exchange resin may be dispersed in the film, e.g. in the at least one layer. The second ion-exchange resin may be uncomplexed to a pharmaceutically active ingredient, and may be described as unloaded or free.

Advantageously, the provision of a free ion-exchange resin in the film may alter the release profile of the first and/or second pharmaceutically active ingredient. Without wishing to be bound by theory, it is thought that the free ion-exchange resin may interact with the first pharmaceutically active ingredient dispersed in the film, e.g. in the at least one layer, and/or may interact with the second pharmaceutically active ingredient which may be released from the resinate. Thus, the release profile and/or rate of the first and/or second pharmaceutically active ingredient may be tailored by selecting a first amount of a first ion-exchange resin for the resinate, and a second amount of a second ion-exchange resin as the unloaded or free resin, the first resin and the second resin being the same or different. Advantageously, the addition of a "free" ion-exchange resin in the film may lead to a more constant release profile of the first and/or second active ingredient over a period of time, compared to the same film without the "free" ion-exchange resin.

The first pharmaceutically active ingredient and/or the second pharmaceutically active ingredient may comprise or may be a therapeutic agent. In other words, the term "pharmaceutically active ingredient" may be herein understood as referring to an active ingredient capable of having a therapeutic effect on a patient, that is, understood to be capable of treating a disease and/or a medical condition.

In an embodiment, the first pharmaceutically active ingredient and/or the second pharmaceutically active ingredient may comprise or may consist of a drug or substance capable of alleviating pain in a subject, e.g. an analgesic.

The first and/or second pharmaceutically active ingredient, e.g., the pharmaceutically active ingredient, may comprise or may consist of an opioid drug and/or derivative thereof. The first and/or second pharmaceutically active ingredient, e.g., the pharmaceutically active ingredient, may comprise or may consist of any other drug class. The first and/or second pharmaceutically active ingredient, e.g., the pharmaceutically active ingredient, may comprise or may consist of one or more of alfentanil, allylprodine, alphaprodine, amfepramone, amphetamine, amphetaminil, anileridine, apocodeine, apomorphine, asimadoline, axomadol, benzylmorphine, bezitramide, bremazocine, brifentanil, buprenorphine, butorphanol, carfentanil, clonitazene, codeine, cyclazocine, cyclorphan, cyprenorphine, cyprodime, deltorphin, desomorphine, dextromethorphan, dextromoramide, dextropropoxyphene, dezocine, diamorphine, diamorphone, diampromide, diacetylmorphine, dihydrocodeine, dihydrocodeinone, dihydroetorphine, dihydromorphine, dimenoxadol, dimephetamol, dimepheptanol, dimethylthiambutene, dioxyaphetyl butyrate, diphenoxylate, dipipanone, diprenorphine, dronabinol, Met-enkephalin, Leu-enkephalin, dynorphin A, dynorphin B, β-endorphin, eptazocine, eridorphin, ethoheptazine, 14-ethoxymetopon, ethylketocyclazocine, ethylmethylthiambutene, ethylmorphine, etonitazene, etorphine, extromoramide, fencamfamine, fenethylline, fenproporex, fentanyl, a-methylfentanyl, beta-funaltrexamine, β-hydroxy-3-methylfentanyl, heroin, hydrocodone, hydromorphone, hydromorphodone, hydroxymethylmorphinan, hydroxypethidine, isomethadone, ketobemidone, kyotorphin, levo-a-acetylmethadol, levacetylmethadol, levallorphan, levomethadone, levomethadyl acetate, levallorphan, levorphanol, levophenacylmorphan, lofentanil, Lofexidine, loperamide, malbuphine, mazindol, melatonin, mefenorex, meperidine, meprobamate, meptazinol, metazocine, methadone, metopon, methyldihydromorphine, methyldihydromorphinone, methyhnorphine, methylnaltrexone, methylphenidate (and stereoisomers), methyprylon, metopon, mirfentanil, modafmil, morphiceptin, morphinan, morphine, myrophine, nabilone, nalbuphine, nalbuphine, nalmefene, nalorphine, naloxone, naloxone benzoylhydrazone, naltrexone, naltriben, naltrindole, naltrindole isothiocyanate, narceine, natbuphine, nicomorphine, nor-binaltorphimine, norlevorphanol, normethadone, nalorphine, normorphine, norpipanone, noscapine, ohmefentanyl, o-methylnaltrexone, opium, onitazene, oxycodone, oxymorphone, papaveretum, papaverine, paregoric, pemoline, pemoline, pentazocine, pethidine, phendimetrazine, phendimetrazone, phenmetrazine, phenadoxone, phenomorphan, phenazocine, phenoperidine, pholcodeine, piminodine, pipradrol, piritramide, prenorphine, profadol, properidine, propheptazine, promedol, properidine, propiram, propoxyphene, propylhexedrine, remifentanil, spiradoline, sufentanil, sufentanyl, tapentadol, thebaine, tramadol, trefentanil, tilidine, viminol or their salts, or opioids of the phenanthrene, morphinan, benzomorphan, methadone, phenylpiperidine, propionanilide 4-anilidopiperidine, 4-aryl piperidines, 4-heteroarylpiperidines class, and the like, and/or salts and derivatives thereof.

In an embodiment, the pharmaceutically active ingredient may be morphine, or a salt or derivative thereof. In another embodiment, the pharmaceutically active ingredient may be apomorphine.

The first and/or second pharmaceutically active ingredient may comprise, may consist essentially of, or may consist of a drug or substance capable of treating and/or preventing of metabolic bone disease in infants, for hypophosphataemia, a condition common to low birth weight infants and associated with osteopenia of prematurity. The first and/or second pharmaceutically active ingredient may comprise, may consist essentially of, or may consist of a potassium salt, e.g., potassium acid phosphate.

The first and/or second pharmaceutically active ingredient may comprise, may consist essentially of, or may consist of a drug or substance capable of treating and/or preventing stomach and/or oesophageal pathological condition, e.g., vomiting, nausea, reflux, or the like. The first and/or second pharmaceutically active ingredient may comprise, may consist essentially of, or may consist of a metoclopramide and/or derivative thereof, e.g., metoclopramide hydrochloride.

The first and/or second pharmaceutically active ingredient may comprise, may consist essentially of, or may consist of a drug or substance capable of treating and/or preventing erectile dysfunction or progressive diseases of the nervous system which can affect locomotion such as Parkinson's disease.

The first and/or second pharmaceutically active ingredient may comprise, may consist essentially of, or may consist of *cannabis* or a *cannabis* derivative such a cannabidiol and/or other cannabinoids.

The first and/or second pharmaceutically active ingredient may comprise, may consist essentially of, or may consist of melatonin.

The formulations described herein may find application in the treatment of humans, especially paediatrics and/or geriatrics, for example, where swallowing of a pill may be problematic. Another area is in the veterinary field where administering pills to animals can be difficult to achieve.

In some embodiments the formulations may be provided so as to provide an extended release of the active ingredient(s) over a period of time, such as at least 1 hour, or more, such as at least 2, 3, 4, 5, 6, 8, or more hours.

According to a second aspect of the invention, there is provided an orally dissolvable film including at least one layer comprising:

a first resinate comprising a first ion exchange resin and a first pharmaceutically active ingredient;

a second resinate comprising a second ion exchange resin and a second pharmaceutically active ingredient; and a matrix and/or binder.

The first resinate and/or the second resinate may be dispersed, e.g. heterogeneously dispersed, in the film, e.g. in the at least one layer.

The film, e.g. the at least one layer, may comprise a matrix and/or binder. Preferably, the film, e.g. the at least one layer, may comprise a polymer matrix. The matrix may be capable of acting as a binder for the remaining ingredients of the film, e.g. of the at least one layer, e.g. at least for the first resinate and the second resinate.

The first pharmaceutically active ingredient and the second pharmaceutically active ingredient may the same or may be different.

The first pharmaceutically active ingredient and the second pharmaceutically active ingredient may be the same. In such instance, the orally dissolvable film may include at least one layer comprising:

a first resinate comprising a first ion exchange resin and a first amount of a pharmaceutically active ingredient;

a second resinate comprising a second ion exchange resin and a second amount of the pharmaceutically active ingredient; and a matrix and/or binder.

The first ion exchange resin and the second ion exchange resin may be the same or may be different.

In one embodiment, the first ion exchange resin and the second ion exchange resin may comprise, may consist essentially of, may consist of, or may be made of the same polymeric resin.

The first and/or second resinate may be provided in the film, e.g. in the at least one layer, in an amount of about 1-50 wt %, e.g., typically about 5-20 wt %.

The ratio (by weight) of the first pharmaceutically active ingredient to the first resin in the first resinate may be about 2:1 to 1:5, typically about 1:1 to 1:2, e.g. about 1:1.5.

The ratio (by weight) of the second pharmaceutically active ingredient to the second resin in the second resinate may be about 2:1 to 1:5, typically about 1:1 to 1:2, e.g. about 1:1.5.

The first ion-exchange resin and/or first resinate may be provided in the form of particles, e.g. beads.

The second ion-exchange resin and/or second resinate may be provided in the form of particles, e.g. beads.

The first ion-exchange resin and/or first resinate, and/or the second ion-exchange resin and/or second resinate may be processed, e.g. coated, encapsulated or the like. The provision of a coating or the resinate particles may alter, e.g. delay, initial release of an active ingredient from its respective resinate.

The film, e.g. the at least one layer, may further comprise a one or more free or unloaded ion exchange resin.

The film, e.g. the at least one layer, may comprise free or unloaded first ion exchange resin.

The film, e.g. the at least one layer, may comprise free or unloaded second ion exchange resin.

The film, e.g. the at least one layer, may comprise free or unloaded third ion exchange resin, that is, the film may comprise an amount of a free or unloaded third ion exchange resin which is different from the first ion-exchange resin and the first ion-exchange resin.

The first ion exchange resin and the second ion exchange resin may comprise or may consist of particles, e.g., beads, having different mesh sizes and/or particle sizes.

The mesh size and/or particle size of the/each ion exchange resin or mixture ion exchange resins may be selected to provide a desired rate of release of the active ingredient or drug, for example as described in respect of the first aspect of the present invention.

In an embodiment, the first ion exchange resin may comprise or may consist of particles, e.g., beads, having a first mesh size, e.g., in the region of 50-100, 100-200, or 200-400 mesh size and/or having a first particle size e.g., in the region of 150-300 µm, 74-150 µm, or 37-74 µm, and the second ion exchange resin may comprise or may consist of particles, e.g., beads, having a second mesh size, e.g., in the region of 50-100, 100-200, or 200-400 mesh size and/or having a second particle size e.g., in the region of 150-300 µm, 74-150 µm, or 37-74 µm, wherein the first mesh size or particular size and the second mesh size or particle size are different.

By such provision, the film may allow release of the first active ingredient at a first release rate, and release of the second active ingredient at a second, different, release rate. This may be particularly advantageous when a patient requires delivery of a predetermined amount of the first active ingredient over a predetermined period of time, and sustained release of the second active ingredient over a predetermined and different period of time. This may also be advantageous when a patient requires delivery of a predetermined amount of a single active ingredient over a predetermined period of time, but such a release profile may not be achievable by incorporating the drug in a single ion exchange resin, whereas incorporation of the drug in an ion exchange resin having two or more different sizes of beads may allow design of an improved release profile of the drug.

The pharmaceutically active ingredient comprised in the first resinate may be associated with a first release rate.

The pharmaceutically active ingredient comprised in the second resinate may be associated with a second release rate.

The first resin may have a mesh size of about 50-100. The first release rate may be about 10-70%, e.g. about 20-60%, after 1 hour, when measured at pH 1.2.

The second resin may have a mesh size of about 200-400. The second release rate may be about 30-99%, e.g. about 50-95%, after 2 hours, when measured at pH 1.2.

The features described in respect of any other aspect of the invention may equally apply in respect of the film according to the second aspect of the invention, and are not repeated here for reasons of brevity.

According to a third aspect of the present invention there is provided a method of delivering one or more pharmaceutically active ingredients to a subject, the method comprising administering orally an orally dissolvable film including at least one layer comprising:

a first pharmaceutically active ingredient;

a resinate comprising an ion exchange resin and a second pharmaceutically active ingredient; and a matrix and/or binder.

The method may comprise dissolving the film in the mouth of the subject.

The method may be carried out on humans (especially paediatrics and/or geriatrics) or animals, such as companion animals, including dogs and cats.

The method may comprise releasing the first pharmaceutically active ingredient in a non-delayed manner. A person of skill in the art will understand the term "non-delayed" to mean that the first pharmaceutically active ingredient is delivered, e.g., immediately delivered, upon dissolution or disintegration of the film, e.g., in the mouth of the subject.

The features described in respect of any other aspect of the invention may equally apply in respect of the method according to the third aspect of the invention, and are not repeated here for reasons of brevity.

According to a fourth aspect of the present invention there is provided a method of delivering one or more pharmaceutically active ingredients to a subject, the method comprising administering orally an orally dissolvable film including at least one layer comprising:

a first resinate comprising a first ion exchange resin and a first pharmaceutically active ingredient;

a second resinate comprising a second ion exchange resin and a second pharmaceutically active ingredient; and a matrix and/or binder.

The first pharmaceutically active ingredient and the second pharmaceutically active ingredient may the same or may be different.

In a preferred embodiment, the first pharmaceutically active ingredient and the second pharmaceutically active ingredient may be the same.

The method may comprise dissolving or disintegrating the film in the mouth of the subject.

The method may comprise releasing the first active ingredient at a first release rate, and releasing the second active ingredient at a second, different, release rate. This may be particularly advantageous when a patient requires delivery of a predetermined amount of the first active ingredient over a predetermined period of time, and sustained release of the second active ingredient over a predetermined and different period of time. This may also be advantageous when a patient requires delivery of a predetermined amount of a single active ingredient over a predetermined period of time, but such a release profile may not be achievable by incorporating the drug in a single ion exchange resin, whereas incorporation of the drug in an ion exchange resin having two or more different sizes of beads may allow design of an improved release profile of the drug.

The features described in respect of any other aspect of the invention may equally apply in respect of the method according to the fourth aspect of the invention, and are not repeated here for reasons of brevity.

According to a fifth aspect of the present invention there is provided use of an orally dissolvable film according to the first aspect or the second aspect of the present invention, in a method of treatment.

The use may comprise treating one or more diseases and/or conditions selected from pain, migraine, headache, inflammation, metabolic bone disease, hypophosphataemia, nausea, vomiting, gastroesophageal reflux disease, anxiety, dyspnoea, sleep disorders, movement disorders e.g. Parkinson's, or the like.

The features described in respect of any other aspect of the invention may equally apply in respect of the use according to the fifth aspect of the invention, and are not repeated here for reasons of brevity.

According to a sixth aspect of the present invention there is provided a method of preparing an orally dissolvable film, the method comprising casting on a support a formulation comprising a first pharmaceutically active ingredient; a resinate comprising an ion exchange resin and a second pharmaceutically active; and a binder.

The formulation may further comprise a liquid medium.

Typically, the liquid medium may comprise, may consist essentially of, may consist of or may be an aqueous solvent, e.g. water.

The binder may comprise, may consist essentially of, may consist of or may be a polymer, for example as described in respect of the first aspect of the present invention.

The method may comprise mixing the formulation prior to casting.

The method may comprise the preliminary step of preparing the resinate.

The resinate may be prepared by providing the ion exchange resin and the second pharmaceutically active in a liquid medium, e.g. water. This step may comprise:

mixing the ion exchange resin and the second pharmaceutically active in the liquid medium;

filtering the resinate;

rinsing the resinate; and/or drying the resinate.

The method may comprise removing the film from the support.

The features described in respect of any other aspect of the invention may equally apply in respect of the method according to the sixth aspect of the invention, and are not repeated here for reasons of brevity.

According to a seventh aspect of the present invention there is provided a method of preparing an orally dissolvable film, the method comprising casting on a support a formulation comprising a first resinate comprising a first ion exchange resin and a first pharmaceutically active ingredient; a second resinate comprising a second ion exchange resin and a second pharmaceutically active ingredient; and a binder.

The first and/or second resinate may be prepared by providing an ion exchange resin and a respective pharmaceutically active in a liquid medium, e.g. water, as described above in respect of the sixth aspect of the present invention.

The features described in respect of any other aspect of the invention may equally apply in respect of the method according to the seventh aspect of the invention, and are not repeated here for reasons of brevity.

DETAILED DESCRIPTION

Figure 2:
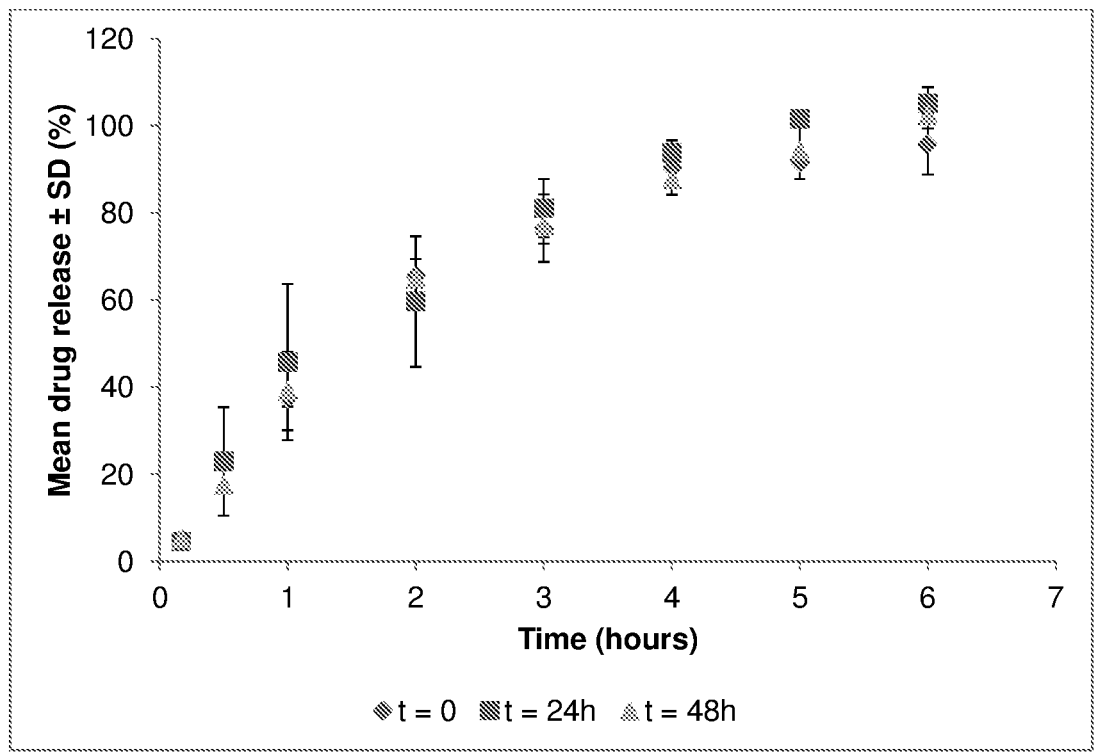
Figure 3:
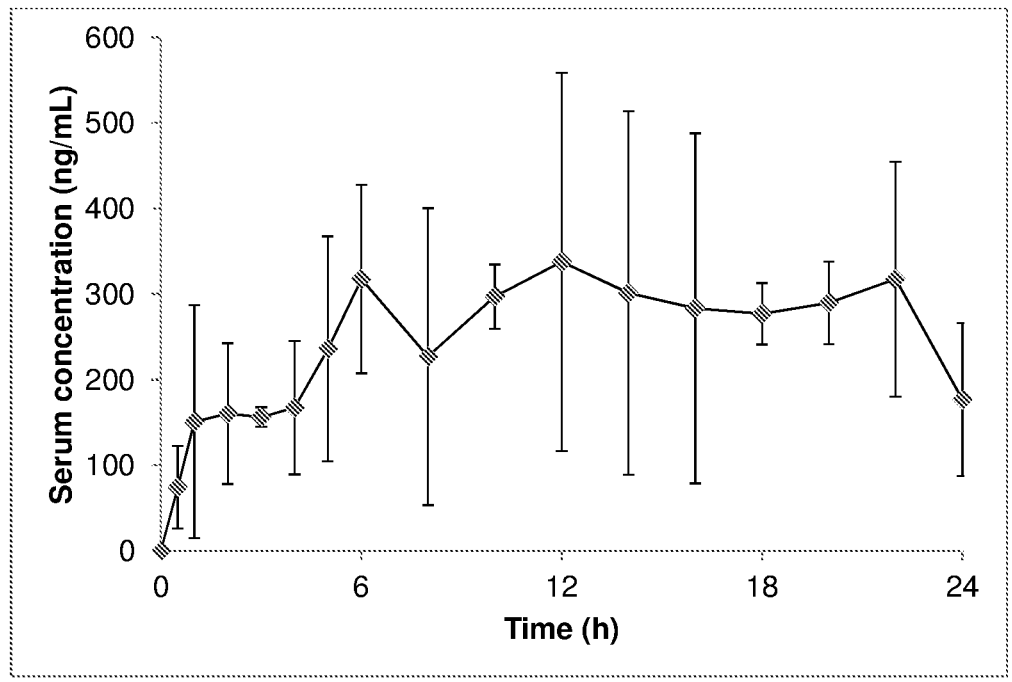
Figure 4:
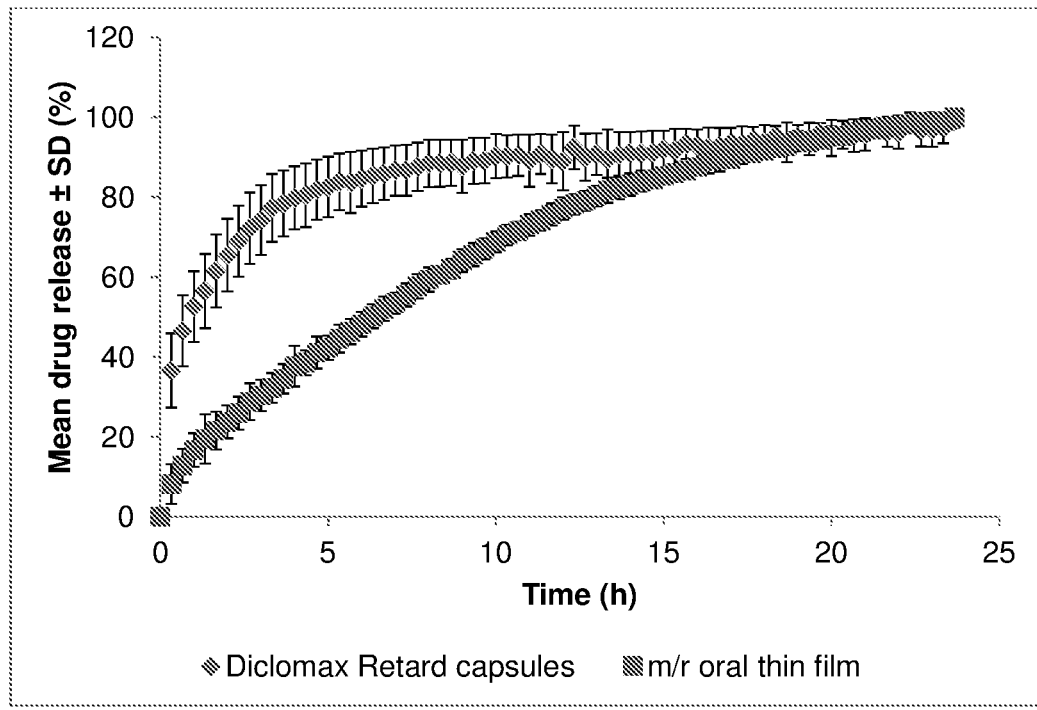
Figure 5:
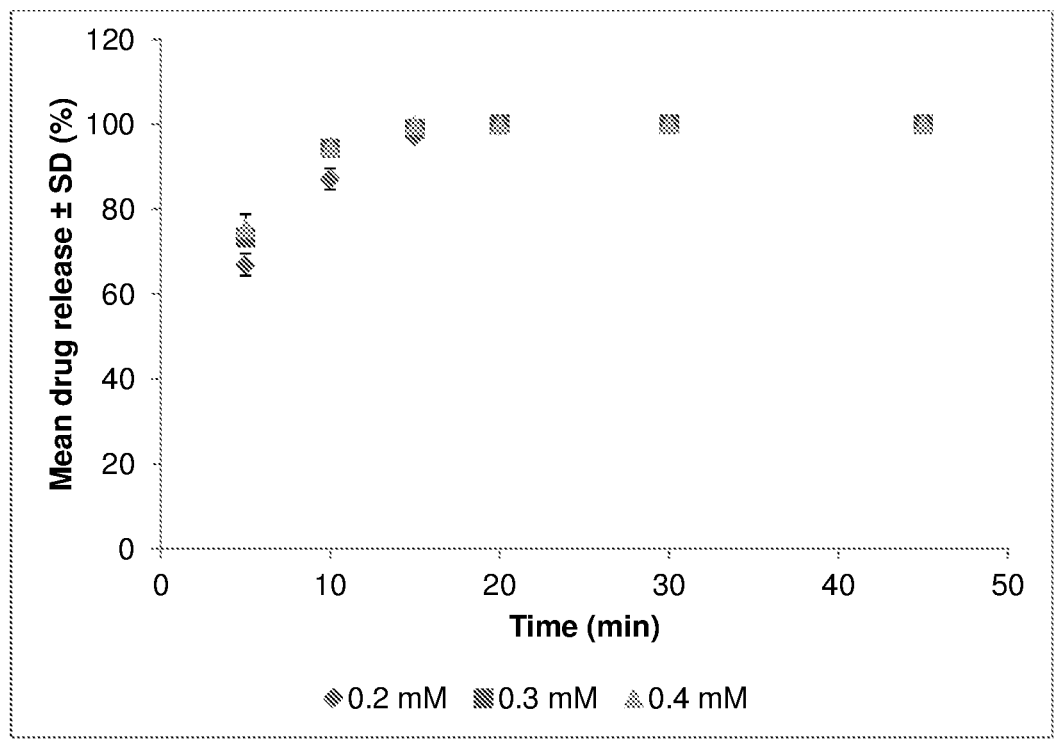
Figure 6:
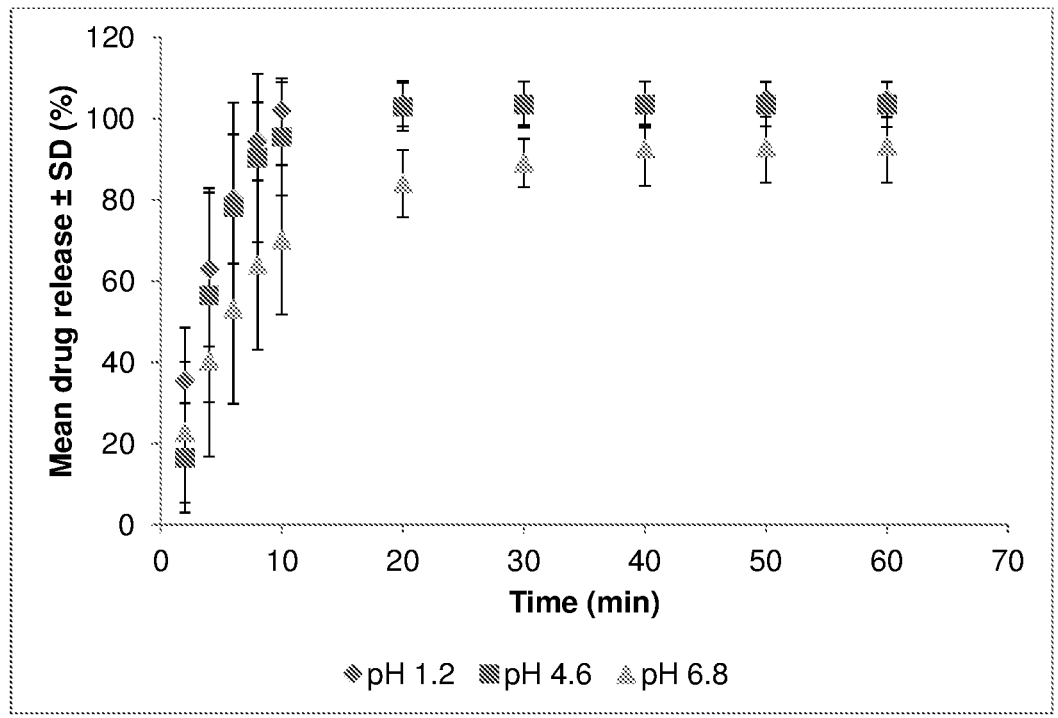
Figure 7:
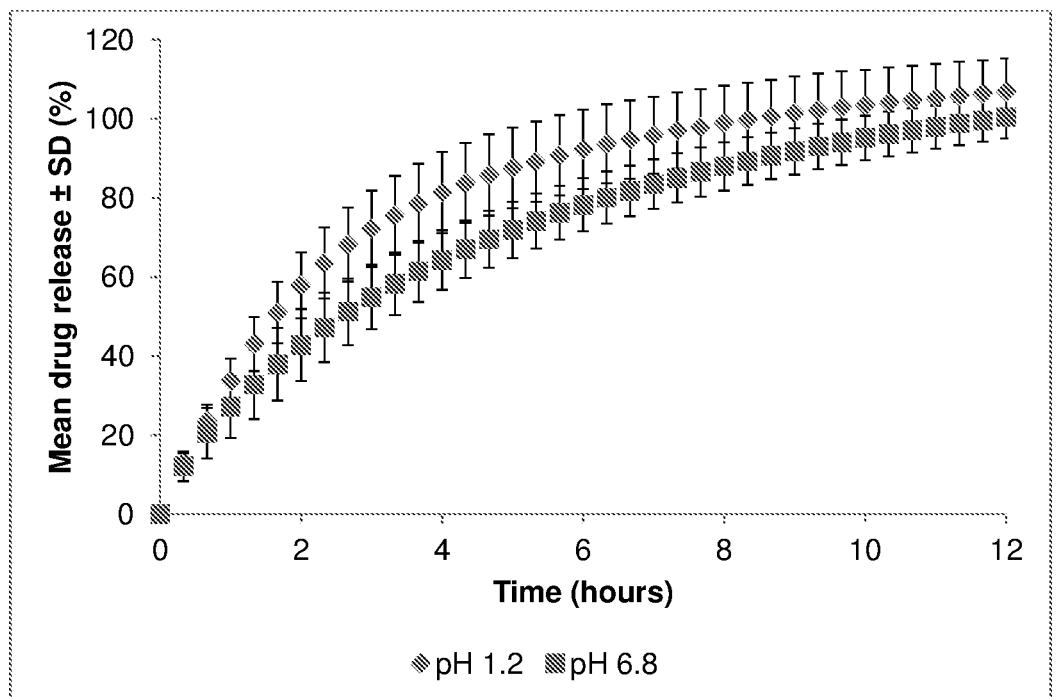
Figure 8:
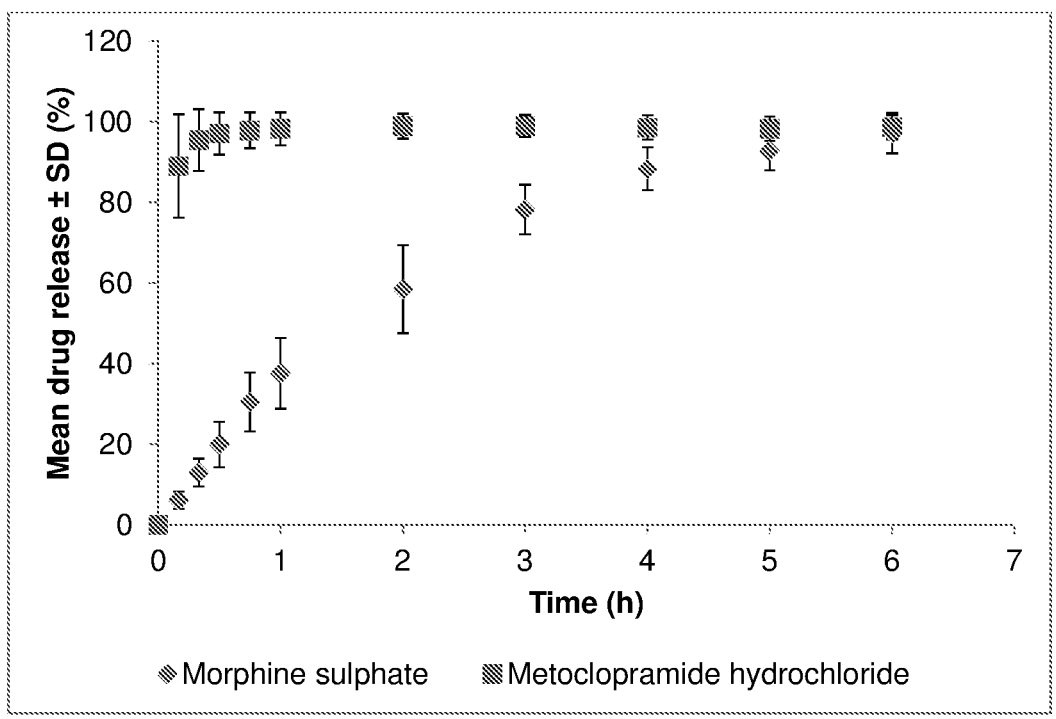
Figure 9:
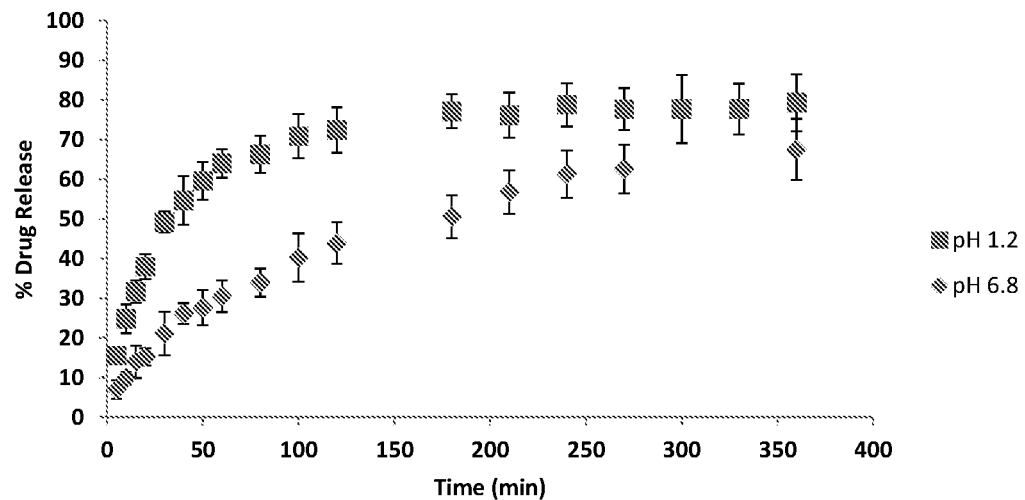
Figure 10:
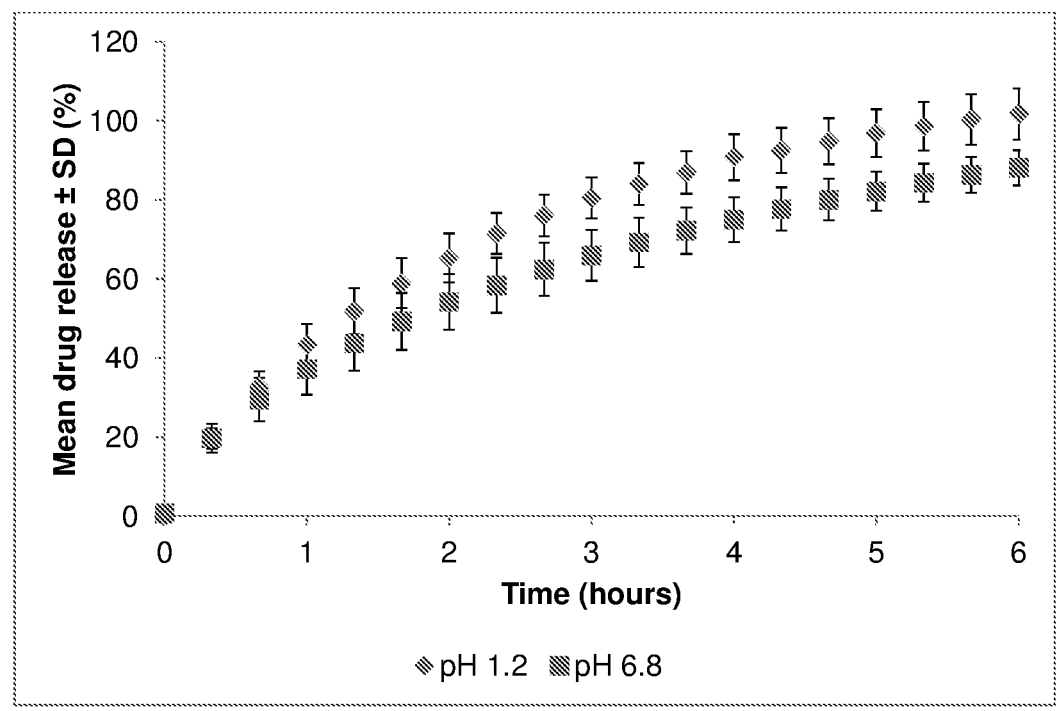
Figure 11:
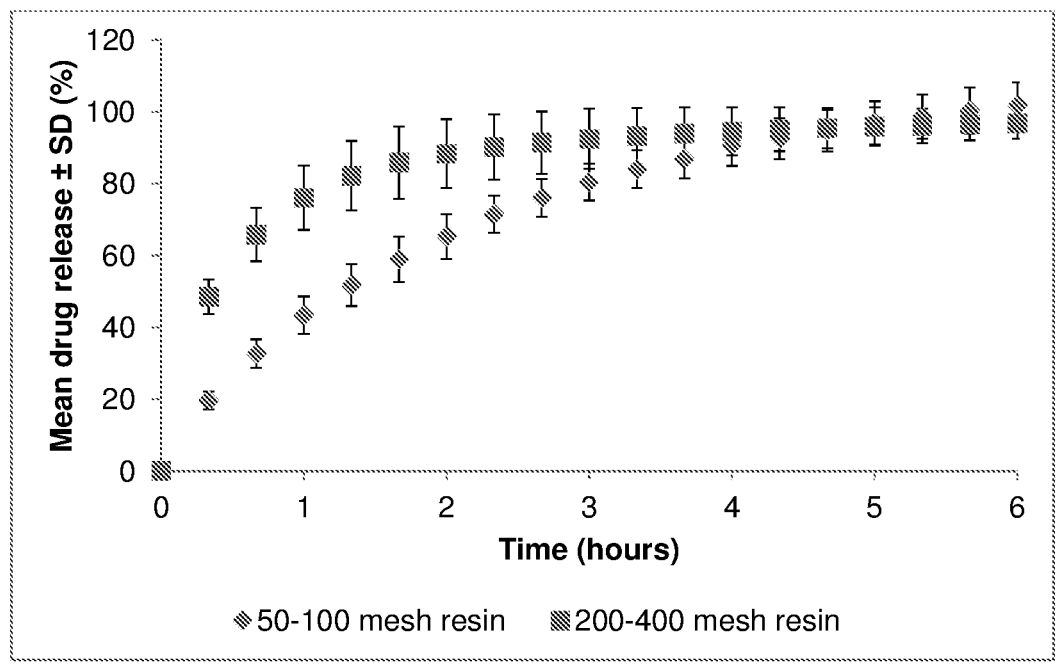
Figure 12:
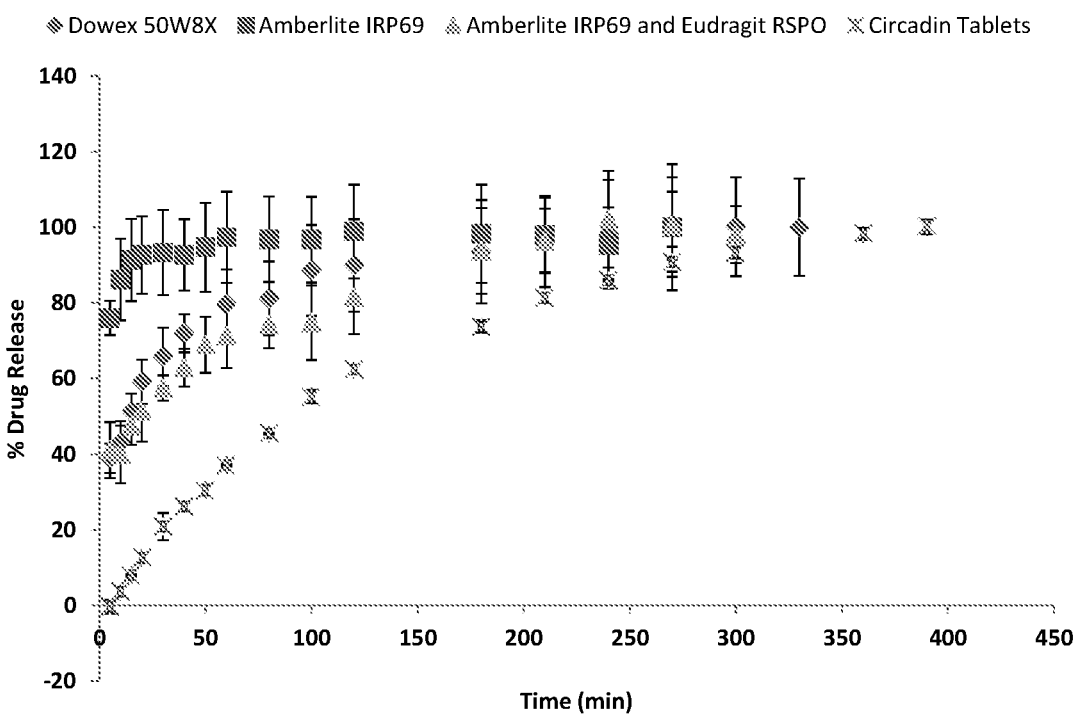
Figure 13:
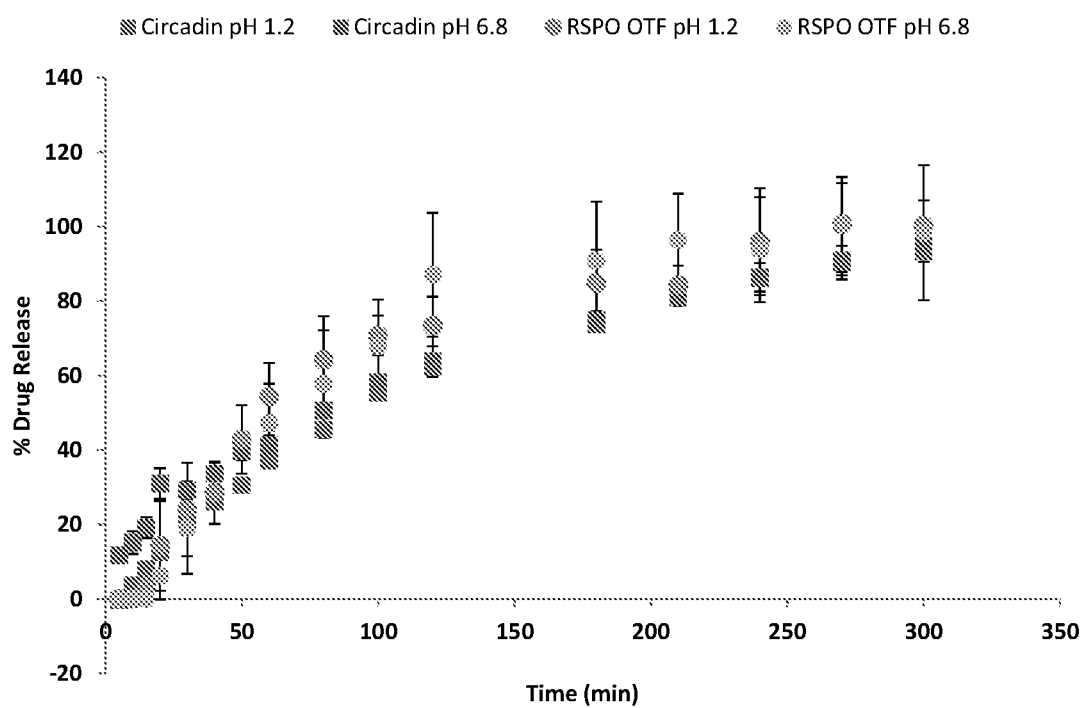

The present invention will now be described in detail and with reference to the following Figures which show:

FIG. 1: Dissolution profiles for 20 mg oral thin films at pH 1.2 and 6.8, and compared to commercially available comparator products (MST® Continus® suspension and MST® Continus® tablets (n=6));

FIG. 2: Drug release profiles at pH 6.8 after delayed casting;

FIG. 3: Serum concentrations of morphine sulphate after oral administration of modified release morphine sulphate oral thin films to rats (n=3, mean±SD);

FIG. 4: Drug release profiles at pH 6.8 of Thin Films containing complexed Diclofenac;

FIG. 5: Drug release profiles at pH 6.8 of Thin Films containing non-complexed potassium acid phosphate;

FIG. 6: Drug release profiles of Thin Films containing 10 mg non-complexed metoclopramide hydrochloride;

FIG. 7: Drug release profiles of Thin Films containing 10 mg complexed metoclopramide hydrochloride;

FIG. 8: Drug release profiles of Thin Films containing complexed morphine sulphate and non-complexed metoclopramide hydrochloride, at pH=6.8;

FIG. 9: Drug release profiles from metoclopramide resinates with 50-100 mesh resin over time at pH 1.2 and 6.8;

FIG. 10: Drug release profiles from oxycodone resinates with 50-100 mesh resin over time at pH 1.2 and 6.8;

FIG. 11: Effect of mesh size on drug release of metoclopramide resonates, at pH 1.2;

FIG. 12: Drug release profiles from melatonin resinates with Dowex 50-100 mesh and Amberlite IRP 69 resins with and without Eudragit RSPO compared to Circadin® tablets at pH 1.2 and;

FIG. 13: Drug release profiles of Thin Films containing melatonin resinates with Amberlite IRP 69 and Eudragit RSPO compared to Circadin® tablets at pH 1.2 and pH 6.8

EXAMPLES

1) Investigation of Oral Thin Films Providing Release of Morphine as Pharmaceutically Active Ingredient Materials and Methods Preparation of Drug Resinate A strong acid cation ion exchange resin with 8% divinylbenzene cross-linking (Dowex® 50WX8, 50-100 mesh [BDH Laboratory Supplies, Poole, UK; Lot K18954850 429]) was dispersed in 100 mL of a 4.0% (w/v) solution of morphine sulphate (kindly donated by Macfarlan Smith, Edinburgh, UK; Lot 13-00396) in distilled water, such that the ratio (by weight) of morphine sulphate to resin was 1:1.5, and stirred by magnetic stirrer (250 rpm) for 24 hours at room temperature, protected from light. The drug-resin complex was then filtered through a 47 mm 0.2 μm nylon membrane (Phenex™, Phenomenex Inc., Cheshire, UK) and rinsed twice with distilled water. The filtrate was diluted and assayed by high performance liquid chromatography (method described below) to indirectly determine the extent of drug loading onto the exchange resin. The drug-resinate was dried at 50° C. for 12 hours.

Formulation of Oral Thin Film

An oral thin film formulation was developed containing 20 mg morphine sulphate loaded within an ion-exchange resin complex (prepared as above). The oral thin films were prepared from a solution composed of:

13.8% w/w of the drug-resinate;
17.4% w/w pullulan (Cornelius, Hertfordshire, UK; Lot 1E0712) as the film forming polymer;
2.3% w/w polyvinyl polypyrrolidone (Sigma-Aldrich, Dorset, UK; Lot KI19107B1) as a disintegrating agent;
1.6% w/w Sisterna SP70 [Sisterna, Roosendaal, Netherlands; Batch No. 548Z22) as an emulsifying agent;
1% w/w lemon 507940T (Firmenich, Meyrin, Switzerland; Batch No. 1000710486) as citrus flavouring agent;
0.9% w/w sucralose (Tate & Lyle, London, UK; Lot XM1D009501) as a sweetener;
0.2% w/w glycerol (Melford Labs Ltd., Ipswich, UK; Batch No. 19256) as a plasticiser; and
distilled water.

All ingredients were weighed on an analytical balance (A&D Instruments Ltd., Abingdon, Oxford, UK; Ser. No. 14/214,367) and combined using an Ultra-Turrax homogeniser (Janke & Kunkel, Staufen, Germany; Serial No. 751808) at 8000 rpm. Films were cast from the polymer solution on to a polymer coated paper using a Micrometer Adjustable Film Applicator (Sheen; 1117/250 mm) at 1.4 mm and dried in a cabinet drier (Mitchell Dryers Ltd., Carlisle, UK) at 40° C. for 30 minutes. Oral thin films were cut to a target weight using a rotary blade.

Additional films were made, containing 5, 10 or 20 mg morphine sulphate, as per Table 1 below:

TABLE 1

| Ingredient | Manufacturer | Batch number | Percentage weight (% w/w) | | |
| --- | --- | --- | --- | --- | --- |
| | | | 5 mg OTF | 10 mg OTF | 20 mg OTF |
| Drug-resinate | Prepared as above | N/A | 10.2 | 10.2 | 13.8 |
| Pullulan | Cornelius, Hertfordshire, UK | 1E0712 | 19.2 | 17.3 | 17.4 |
| Polyvinyl polypyrrolidone | Sigma-Aldrich, Dorset, UK | KI19107BI | 2.6 | 2.4 | 2.3 |
| Glycerol | Melford Labs Ltd., Ipswich, UK | 19256 | 0.2 | 0.2 | 0.2 |
| Sucralose | Tate & Lyle, London, UK | XM1D009501 | 1.0 | 1.0 | 0.9 |
| Lemon flavour | Firmenich, Meyrin, Switzerland | 1000710486 | 1.0 | 1.1 | 1.0 |
| Sisterna SP70 | Sisterna, Roosendaal, Netherlands | 548Z22 | 1.8 | 1.7 | 1.6 |
| Water, distilled | In house | N/A | 64.0 | 66.2 | 62.8 |
| Target oral thin film mass (mg) | | | 40 | 90 | 150 |

High Performance Liquid Chromatography (HPLC) Method

Based on work by Lee and Sabra (G. Lee, K. Sabra, Stability of morphine sulphate in ANAPA Plus ambulatory infusion device and PEGA infusion sets, Eur J Hosp Pharm-S P, 12 (2006) 76-80), a validated reverse phase HPLC method was developed using an ACE C18 column (4.6 mm diameter×150 mm length packed with a 5 μm diameter stationary phase) fitted with a guard column of the same material. A 1.5 mL/min flow rate was set and a wavelength of 237 nm for UV absorbance. An isocratic mobile phase consisting of aqueous 1% (w/v) ammonium acetate and acetonitrile (90:10 v/v) was used for elution. 20 μL samples were injected onto the column. Standards were prepared using morphine sulphate (Macfarlan Smith, Edinburgh, UK; Lot 13-00396) dissolved in HPLC grade water and all measurements were taken in triplicate.

Characterisation

Homogeneity of Drug-Resin Dispersion and Uniformity of Content

It was observed that the ion-exchange resin beads were sufficiently distinct from the polymer film background in colour that they could be individually identified and counted when viewed under a microscope or when scanned or photographed at a sufficiently high resolution. To assess the uniformity of the resinate distribution throughout the oral thin film matrix, a sheet of oral thin film material containing the drug-resin complex was scanned using an EPSON Stylus SX515W scanner at 2400 dpi. A 5 mm square grid was superimposed over the image and the cells were numbered. Using an online random number generator (http://www.randomizer.org/), a set of twenty unique random cells was identified for analyses. Manual counts of distinct drug-resin beads were performed for each square sample using ImageJ (Maryland, USA) image processing software. Partial beads that appeared on the edges of the square were included in the count.

For assessment of content uniformity across the batch, we applied the requirements of the Pharmacopoeial monograph for prolonged release morphine tablets. That is, the morphine content of 10 randomly selected dosage units from a batch should lie within 5% of the stated content (British Pharmacopoeia Commission, British Pharmacopoeia Volume III, Formulated Preparations: Specific Monographs, Prolonged-release Morphine Tablets, in: British Pharmacopoeia 2014, The Stationery Office on behalf of the Medicines and Healthcare products Regulatory Agency (MHRA), London, England, 2014). Using compendial Type II dissolution equipment, each film was dispersed in 900 mL 0.1N HCl at 37° C. and stirred using the paddle method at 50 rpm for 48 hours. An aliquot of each solution was filtered through a 0.22 μm syringe filter and analysed by HPLC for morphine sulphate content.

Microbial Bioburden

Bioburden analyses were performed on the pullulan film according to ISO 11737-1. Tryptone soya agar was used for bacterial colony growth and was incubated for 3 days at 35±1° C. Sabouraud dextrose agar was used for yeast and fungal counts which were cultured over 5 days at 22±1° C.

Oral Thin Film Tensile Strength and Disintegration

The British Pharmacopoeia features a general monograph for orodispersible films which declares that dosage units should be of "suitable mechanical strength to resist handling without being damaged" [21]. A tensiometer (Instron, High Wycombe, UK) was used to study the elongation and load required to break the pullulan films. Each film was secured between a set of two 'jaws' and a measurement of the breaking force (N) and the increase in length at breaking point (mm) were recorded. For assessment of dosage form disintegration, a novel methodology published by Preis et al. [22] was applied. The method utilised an adaptation of an existing compendial apparatus for dynamic assessment of tablet disintegration. Each oral thin film (n=6) was suspended from the arm of a disintegration tester (Copley Scientific, Nottingham, UK; Serial No. 21169) using a small clip at the top edge. At the lower edge, a second clip was attached with an additional weight added such that the total weight of the clip came to 3 grams. Distilled water maintained at 37° C. was used as the disintegration media. The water level was set such that when the suspending arm reached its lowest point, the oral thin film was halfway submerged. A timer was started and the endpoint was visually recorded as the point at which the oral thin film disintegrated, dropping the weight.

Thermal Stability

In order to assess thermal stability of the modified release morphine sulphate oral thin films, a batch of films were heat sealed in aluminium laminated pouches and stored in an incubator at 40° C.±2° C. for 6 months. At time intervals (0 months, 3 months and 6 months) samples were removed for weight and drug content analyses. At each time point 10 randomly selected films were individually weighed and dispersed in 900 mL of 0.1 M HCl at 37° C. (stirred by paddles at 50 rpm) for 24 hours. The solutions were filtered through 0.22 μm syringe filters into vials for assay by H PLC. As per the ICH Guidelines, a change of more than 5% was considered 'significant' [23]. 2-sample t-tests were also performed to compare groups using Minitab® statistical software (version 16.2.4).

In Vitro Dissolution

Dissolution testing was carried out on oral thin films (n=6 for each pH) using the paddle method as described in the British Pharmacopoeia. Dissolution media used were hydrochloric acid media (pH 1.2) and phosphate buffer solution (pH 6.8), as described in British Pharmacopoeia (British Pharmacopoeia Commission, British Pharmacopoeia 2014 Online. Appendix XII B. ANNEX: Recommendations on Dissolution Testing, in, London, England: The Stationery Office on behalf of the Medicines and Healthcare products Regulatory Agency (MHRA), 2014). Each dissolution vessel contained 900 mL of media maintained at 37° C., with a paddle speed of 50 rpm. Drug concentrations were determined by HPLC as described above. Samples were extracted through 0.22 μm filters at 0 mins, 10 mins, 20 mins, 30 mins, 1 hour, 1.5 hours, 2 hours and then hourly until 6 hours. MST® Continus® 20 mg suspension (Napp Pharmaceuticals Ltd., Cambridge, UK; Batch No. 169935) was used as a comparator product and dissolution was performed by the same method. Release profiles were also obtained from a sample of MST® Continus® 10 mg tablets (Napp Pharmaceuticals Ltd., Cambridge, UK; Batch No. 176133) using the same dissolution method; samples were measured by UV spectrophotometry at 210 nm.

Dissolution profiles were compared for statistical similarity using the f2 statistic. The Microsoft Excel add-in program, DDSolver, was used to calculate the f2 similarity factor using the bootstrap method (Y. Zhang, M. Huo, J. Zhou, A. Zou, W. Li, C. Yao, S. Xie, DDSolver: an add-in program for modeling and comparison of drug dissolution profiles, Aaps j, 12 (2010) 263-271). An f2 value above 50 indicated similarity between dissolution profiles.

Delayed Casting for Industrial Scale Up

Manufacture of oral thin films can be easily scaled up to an industrial level. However, given the combination of technologies included in the novel modified release formulation, it was questioned as to whether release of the active pharmaceutical ingredient could occur if the drug-resinate lay suspended within the viscous stock solution for a sustained period of time, prior to film manufacture. To assess this, a viscous stock solution was homogenised which contained 63.7% (w/w) distilled water, 19.1% (w/w) pullulan, 10.2% (w/w) drug-resinate (prepared as described above), 2.5% (w/w) polyvinyl polypyrrolidone, 1.8% (w/w) Sisterna SP70, 1.1% (w/w) sucralose, 1.0% (w/w) lemon 507940T flavour, and 0.5% (w/w) glycerol. This solution was allowed to stand and oral thin films were cast from the mixture after 0, 24 and 48 hours. The mixture was re-homogenised by hand before each casting. Dissolution was assessed at pH 6.8 in phosphate buffer, B.P. using HPLC and the methods described above for each time point.

In Vivo Single Dose Pharmacokinetic Study in Rats

Study Design

A pharmacokinetic study by Nakamura et al. (K. Nakamura, E. Nara, T. Fuse, Y. Akiyama, Pharmacokinetic and pharmacodynamic evaluations of novel oral morphine sustained release granules, Biol Pharm Bull, 30 (2007) 1456-1460) evaluated a once daily, modified release formulation of morphine hydrochloride based on a swelling, layered polymer system. A daily dose of 160 mg/kg morphine was administered as controlled release granules to rats and yielded a plasma concentration greater than 250 ng/mL 24 hours after administration. The authors also noted that during their study design, it was observed that a 40 mg/kg dose of an aqueous morphine solution was required to achieve a 500 ng/mL plasma concentration. Based on this design, we conducted a single dose pharmacokinetic study in twelve healthy male Sprague Dawley® rats weighing 342-371 g; average (SD) weight 359.3(9.8) g. Each rat was administered a sustained release orodispersible thin film which contained 50 mg morphine sulphate (135-146 mg/kg bw) under isoflurane (IsoFlo®, Abbott Laboratories Ltd., Berkshire, UK) anaesthesia. The oral thin film was placed inside the cheek using forceps and wetted by the administration of approximately 100 µL of water. Staggered blood samples (400 µL) were taken from the tail vein (under anaesthesia) with each rat contributing to four time points in total such that across the 24 hour period, three samples were obtained at 0.5, 1, 2, 3, 4, 5, 6, 8, 10, 12, 14, 16 18, 20, 22, and 24 hours. Blood samples were collected in clean 1.5 mL PPE Eppendorf® tubes and allowed to coagulate at 3-5° C. in an upright position. Samples were then centrifuged at 9503 g for 10 minutes to separate the serum which was transferred to clean 2 mL Eppendorfs® and frozen at 80° C. prior to analysis. After the terminal blood samples were taken, the rats were euthanized using carbon dioxide.

Extraction of Morphine Sulphate from Rat Serum and HPLC-UV Assay

Based on a method published by Mandy et al. (T. Mandy, T. H. El-Shihi, M. M. Emara, M. Giorgi, New HPLC method to detect individual opioids (heroin and tramadol) and their metabolites in the blood of rats on combination treatment, J Chromatogr Sci, 50 (2012) 658-665) on the detection of heroin, tramadol, and their metabolites in whole blood, a method for the extraction and subsequent quantification of morphine sulphate from rat serum was developed. Extractions were carried out in clean 2 mL Eppendorf® tubes. 20 µL of a 5 µg/mL nalorphine hydrochloride (internal standard) solution (in methanol) was added to 170 µL rat serum containing morphine and vortexed for 30 seconds. 85 µL of 0.2 M borate buffer (pH 9.0) was added and vortexed for 30 seconds. 1 mL of extraction solvent (methyl tert-butyl ether (MTBE)) was added and vortexed for 30 seconds. The sample was then shaken via vial rotation (40 rpm) for 10 minutes and centrifuged for 10 minutes at 9503 g. The organic layer was transferred to a clean 2 mL Eppendorf® tube and evaporated under nitrogen in a water bath at 40° C. A further 2×1 mL extractions were performed with MTBE. The organic layers were combined in the same Eppendorf® tube each time after centrifuging and were evaporated to leave a single residue. The residue was reconstituted in 150 µL mobile phase (ammonium acetate 1% (w/v): acetonitrile [90:10]), and 100 µL was injected onto the HPLC column.

HPLC-UV detection of morphine sulphate and nalorphine at 237 nm was carried out using an ACE C18 column (4.6 mm diameter×150 mm length packed with a 5 µm diameter stationary phase) fitted with a guard column of the same material. The mobile phase consisted of acetonitrile-ammonium acetate 1% (w/v) and analyses were performed in gradient mode at a flow rate of 2 mL/min. Table 2 describes the composition of the mobile phase throughout the gradient method.

TABLE 2

Gradient method mobile phase composition

| Time (mins) | 0 | 3 | 8 | 10 | 13 | 15 |
|---|---|---|---|---|---|---|
| 1% (w/v) ammonium acetate (%) | 95 | 90 | 80 | 75 | 95 | 95 |
| Acetonitrile (%) | 5 | 10 | 20 | 25 | 5 | 5 |

To assess the recovery achieved through this method of extraction, 10 repeats were carried out on blank serum samples spiked with known concentrations of morphine sulphate and internal standard to provide morphine concentrations within a 500-700 ng/mL range. Our HPLC-UV method was validated as per ICH guidelines (data presented in brief).

Results

Morphine Sulphate Loading into Ion Exchange Resin

The HPLC method for assay of morphine sulphate at 237 nm showed good linearity across concentration range 1-30 µg/mL (n=5; $R^2$=0.9998), which represented approximately 5-135% of the test concentrations for dissolution and content uniformity assays. Additionally, when two morphine sulphate samples were adulterated with Ponceau 4R (a colorant present in MST® Continus® suspension which interfered with standard UV spectrophotometric measurements) at concentrations of 2.57 and 12.85 µg/mL, no interfering peaks were observed at 237 nm. Analysis of the drug-resinate filtrate revealed that 2.81% of the available morphine sulphate did not complex with the ion exchange resin. Therefore the resulting dried drug-resin complex had a morphine sulphate content of 39.519% (w/w).

Characterisation

Content Uniformity

A random sample of 10 oral thin films was found to comply with the Pharmacopoeial monograph as no individual film deviated from the target 20 mg morphine sulphate content by more than 5%. Mean (SD) morphine sulphate content was 20.17 (0.52) mg; range 19.27-20.86 mg. The batch also conformed in terms of mass uniformity as no individual dosage unit deviated from the mean mass by more than 7.5%. Mean (SD) oral thin film mass was 110.12 (2.18) mg; range 107.6-114.1 mg.

Homogeneity of Resinate Dispersion

The mean (SD) number of IER beads per 0.5×0.5 cm oral thin film sample was 60.6 (5.65); range 51-70.

Microbial Bioburden

Assessment of the microbiological quality of the oral thin films revealed no fungal or yeast growth, and minimal bacterial growth (10-20 cfu). Acceptance criteria according to the British Pharmacopoeia require that total aerobic microbial (TAMC) and total combined yeasts and moulds (TYMC) counts are less than 2000 and 200 colony forming units per gram respectively.

Oral Thin Film Tensile Strength and Disintegration

The average (SD) load in Newtons required to break the films was 25.6 (6.3); range 15.5-37.2. The average (SD) increase in length at the breaking point in millimetres was 4.8 (1.1); range 3.7-6.6. The average (SD) time to disintegration was 6.15 (0.98) seconds; range 5.0-7.7.

Thermal Stability

The batch conformed to ICH requirements for thermal stability as no changes in mass or morphine sulphate content greater than 5% were observed with 6 months of storage at 40° C. In addition, 2-sample t-tests revealed no statistically significant differences in mass (p-values 0.308 and 0.860 after 3 and 6 months respectively) or drug content (p-values 0.168 and 0.681 after 3 and 6 months respectively) compared to time zero.

Dissolution

FIG. 1 shows the dissolution curves for the oral thin film formulation compared to MST® Continus® suspension and MST® Continus® tablets at pH 1.2 and 6.8 respectively.

Dissolution Results Following Delayed Casting

Dissolution profiles for films cast after 0, 24 and 48 hours are presented in FIG. 2. Similarity tests, comparing the release profiles, gave f2 factors of 59.6 (0 vs. 24 hours), 73.2 (0 vs. 48 hours) and 63.8 (24 vs. 48 hours). Therefore, storage of stock solution for up to 48 hours did not have a significant effect on drug release from the ion exchange resin. It would appear that there is insufficient ionic availability within the highly viscous stock media to support an exchange reaction for drug release. This is reassuring and further demonstrates that ion exchange resin technology is appropriate for providing controlled release from an oral thin film formulation.

In Vivo Single Dose Pharmacokinetic Study in Rats

Method Validation

Extractions of spiked serum samples in the 500-700 ng/mL morphine sulphate concentration range (n=10) achieved an average (SD) recovery of 97.5(4.6)%. The HPLC-UV method showed excellent linearity for both analytes. Peaks for both analytes were sufficiently separated from impurities which appeared in the blank matrix to avoid interference. Limits of detection and quantification were established at 40 ng/mL and 150 ng/mL respectively. Repeat extractions (n=5) at the limit of quantification (148.4 ng/mL) in spiked rat serum samples achieved an average (SD) morphine sulphate recovery of 91.2(12.1)%.

Single Dose Pharmacokinetic Results

The serum profile of morphine after a single oral dose of modified release morphine sulphate oral thin films to rats is shown in FIG. 3. A maximum (SD) serum concentration ($C_{max}$) of 337.6 ng/mL was obtained by ($T_{max}$) 12 hours. The $AUC_{0-24h}$, calculated using the linear trapezoidal method was 6.18 μg~h/mL.

Discussion

A sustained release oral thin film capable of delivering 20 mg morphine sulphate over a 6 hour period (above 80% release within 3-6 hours in vitro) was successfully formulated using ion exchange resin technology. The film was flexible, non-brittle and had a sweet, citrus taste and aroma. The method of manufacture described herein produced an even distribution of the drug-resin complex throughout the oral thin film (relative standard deviation 9.3%), resulting in a dosage form that complied with pharmacopoeial standards in terms of mass and content uniformity. Oral thin films provide an alternative solid dosage platform for drug delivery, and can be formulated without the need for preservatives due to its low available water content. This is an attractive option for paediatric drug delivery where many antimicrobial preservatives have known toxicity concerns in children e.g. benzoates (J. Lass, K. Naelapää, U. Shah, R. Käär, H. Varendi, M. A. Turner, I. Lutsar, Hospitalised neonates in Estonia commonly receive potentially harmful excipients, BMC Pediatr, 12 (2012) 136). Our bioburden results reiterate the low capability for oral thin films to support microbial growth. Thin films offer a discreet and convenient alternative to other solid dosage forms such as tablets with improved stability over liquid formulations. Unlike liquid preparations, which often require the accurate measurement of small volumes or reconstitution before administration, oral thin films offer accurate dosing and require no additional water for administration. They dissolve immediately upon contact with saliva and therefore remove choking risks for patients who may not be able to swallow other solid dosage forms (R. Bala, P. Pawar, S. Khanna, S. Arora, Orally dissolving strips: A new approach to oral drug delivery system, International journal of pharmaceutical investigation, 3 (2013) 67-76). Composed of minimal food or pharmaceutical grade excipients, they are cheap to produce and can be easily scaled up.

When compared to MST® Continus® suspension, our results showed comparable, but not statistically identical (f2<50), dissolution profiles between the two formulations. The oral suspension product utilised the same ion exchange resin technology for its release mechanism, however we found that our thin film preparation achieved a slower drug release profile compared to the commercial suspension. This was likely due to a surface area effect on exchange kinetics since the commercial product contained the same ion exchange resin form, however with a greater mesh size (i.e. smaller particle size), resulting in a more rapid diffusion from within the resin (The Dow Chemical Company, The advantages of uniform particle sized ion exchange resins, in: Dow Liquid Separations, The Dow Chemical Company, Edegem, Belgium, 2006). MST® Continus® tablets incorporate an ethyl cellulose swelling matrix as opposed to ion-exchange technology for their controlled release. They produced a significantly slower release profile in vitro. Although no data exists in the public domain comparing MST® Continus® suspension with other formulations, pharmacokinetic data collected by Napp Pharmaceuticals Ltd. show MST® Continus® suspension to have an equivalent systemic bioavailability to an immediate release morphine sulphate solution and result in an in vivo plasma profile comparable to MST® Continus® tablets (Napp Pharmaceuticals Limited, MST Continus suspensions 20, 30, 60, 100 and 200 mg—Summary of Product Characteristics (SPC), in: electronic Medicines Compendium (eMC), 2014). Our results indicate that the dissolution profile of our oral thin film formulation lies between that of MST® Continus® suspension and MST® Continus® tablets. At pH 6.8, the release profiles of our formulation were found to be statistically similar to the tablet preparation (observed f2=57.775). It would therefore be reasonable to assume that the plasma profile of our formulation would also be comparable in a human in vivo study.

The results of our in vivo study in rats compliment the in vitro dissolution profiles, demonstrating the controlled and sustained release of morphine sulphate achievable though ion exchange resin technology, delivered in an oral thin film dosage design. Serum concentrations, after a single oral dose of approximately 140 mg/kg to rats, increased steadily across the first 6 hours and plateaued around 300 ng/mL with the maximum concentration achieved by 12 hours. Average serum levels of morphine remained elevated even after 24 hours.

Our results demonstrate that oral thin films are a suitable platform for the oral administration of sustained release drug delivery technologies. Ion exchange resins proved a simple and effective option for controlling drug release, with predictable and reproducible release profiles, and these can be easily formulated within an oral thin film. A wide variety of different cation and anion exchange resins are commercially available, including some with pharmacopoeial monographs e.g. Amberlite™ IRP69 (sodium polystyrene sulfonate) (British Pharmacopoeia Commission, British Pharmacopoeia 2015 Online. General Notices. Sodium Polystyrene Sulphonate., in, London, England: The Stationery Office on behalf of the Medicines and Healthcare products Regulatory Agency (MHRA), 2014). These provide the formulator with a range of release rate options that may be of value for different APIs. In addition, the oral thin film could be formulated with an amount of free drug in addition to the resinate complex, allowing for a rapid, immediate release of the active ingredient followed by a continued, sustained release.

2) Investigation of Oral Thin Films Providing Release of Other Pharmaceutically Active Ingredients Controlled Release Films Containing Diclofenac Diclofenac is used as an analgesic and as an anti-inflammatory drug.

Dowex® 1X8 (50-100 mesh), a strong base anion ion exchange resin with 8% divinylbenzene cross-linking, was dispersed in a 25 mM solution of diclofenac sodium in distilled water, such that the ratio of diclofenac to resin was 1:1.5 by weight, and stirred by magnetic stirrer for 24 hours. The drug-resin complex was then filtered through a 47 mm 0.2 μm nylon Phenex™ membrane and washed with distilled water. The filtrate was diluted and assayed by UV spectrophotometry at 276 nm to indirectly determine the extent of drug loading. The drug-resinate was dried at 50° C.

An oral thin film formulation was produced containing 12.5 mg diclofenac sodium loaded within an ion-exchange resin complex (Dowex® 1X8, 50-100 mesh, prepared as above). A viscous stock mixture was prepared containing 15.9% (w/w) drug-resinate; 17.9% (w/w) pullulan (which was included as the film forming polymer; 2.4% (w/w) polyvinyl polypyrrolidone as a disintegrating agent; 0.2% (w/w) glycerol as a plasticiser; 1.0% (w/w) sucralose as a sweetener; 1.0% (w/w) lemon flavour to give the oral thin film a citrus flavour and aroma; 1.7% (w/w) Sisterna SP70 as an emulsifying agent; and distilled water. All ingredients were weighed on an analytical balance and combined using an Ultra-Turrax homogeniser at 8000 rpm. The films were cast on polymer coated paper using a Micrometer Adjustable Film Applicator to a thickness of 1.4 mm, and dried in a cabinet drier at 40° C. for 20 minutes. Oral thin films were cut using a rotary blade and template.

A 50% entrapment efficiency was achieved with 41% drug loading resulting in a resinate containing 21% (w/w) diclofenac sodium. Drug release from the combination oral thin films (n=6) at pH 6.8 is shown in FIG. 4.

It can be observed that release of the drug was sustained over a similar period as compared with morphine sulphate, with approximately 40% release after about 5 hours.

Immediate Release Films Containing Potassium Acid Phosphate

Adequate phosphate intake is important for the prevention of metabolic bone disease in preterm infants. The aim was to formulate potassium acid phosphate (KAP) into an oral thin film for use as a source of phosphorus in the treatment and prevention of hypophosphataemia, a condition common to low birth weight infants and associated with osteopenia of prematurity.

Three KAP oral thin film strengths were manufactured. Films were cast from homogenous solutions, the compositions of which are described in Table 4 below.

TABLE 4

| Ingredient | Manufacturer | Batch No. | 0.2 mM | 0.3 mM | 0.4 mM |
|---|---|---|---|---|---|
| | | | Percentage weight (% w/w) | | |
| Potassium acid phosphate | Sigma-Aldrich, Dorset, UK | 031MOO33V | 22.5 | 36.7 | |
| Pullulan | Hayashibara Co., Ltd., Okayama, Japan | 9K1612 | 16.9 | 13.8 | |
| Polyvinyl pyrrolidone K30 | Sigma-Aldrich, Dorset, UK | MKBC3440V | 2.2 | 1.8 | |
| Sisterna SP70 | Sisterna, Roosendaal, Netherlands | 548Z22 | 1.6 | 1.3 | |
| Sucralose | Nantong ChangHai Food Additive Co., Ltd., | 20120715 | 0.3 | 0.3 | |
| Lemon flavour 507940 T | Firmenich, Meyrin, Switzerland | 1000710486 | 0.2 | 0.2 | |
| Glycerol | Melford Labs Ltd., Ipswich, UK | 19256 | 0.1 | 0.1 | |
| Water, distilled | In house | N/A | 56.2 | 45.9 | |
| Target drug content (mg) | | | 27.22 | 40.83 | 54.44 |
| Target mass (mg) | | | 50-60 | 60-70 | 85-95 |

Using compendial dissolution apparatus (Type II), more than 95% drug release occurred within 15 minutes in all potassium acid phosphate oral thin film batch strengths across physiological pH range (pH 1.2, 4.6 and 6.8) and the formulation is therefore considered to be 'very rapidly dissolving' (World Health Organization, 2006).

Oral thin films batches were found to conform to Pharmacopoeial standards of uniformity in terms of mass and drug content.

Results of drug release profiles at pH 6.8 are shown in FIG. 5.

It can be seen from the release profile that, for all three drug concentrations, the release profile was "immediate", with 67-75% drug release after 5 mins, and 87-95% drug release after 10 mins.

Immediate Release Films Containing Metoclopramide Hydrochloride

A viscous solution was prepared which was composed of 8.6% (w/w) metoclopramide hydrochloride, 20.2% (w/w) hydroxypropyl methylcellulose E5 as the water-soluble film-forming polymer, 2.3% (w/w) sucralose as a sweetener, 2.0% (w/w) spearmint flavour to give the films a mild mint flavour and aroma, 0.9% (w/w) polyvinyl polypyrrolidone to improve the disintegration properties of the film, 0.8% (w/w) glycerol and 0.7% (w/w) poly(ethylene glycol) average molecular weight 1500 as plasticizers, 0.3% (w/w) menthol as a flavouring agent; and distilled water. The ingredients were weighed on an analytical balance and combined using an Ultra-Turrax homogeniser at 8000 rpm. A film was cast onto polymer coated paper using a Micrometer Adjustable Film Applicator at 1.6 mm and dried in a cabinet drier at 40° C. for 25 minutes. Oral thin films were cut by hand using a rotary blade and 15 mm cutting template.

The oral thin film batch conformed to Pharmacopoeial standards of uniformity as the films were within 10% of the stated target metoclopramide content and mean mass. The average (n=10) drug content (SD) was 9.84(0.51) mg, range 9.27-10.77 mg and the average dosage unit mass was 37.23(1.91) mg, range 34.8-40.5 mg.

Results of drug release profiles at three different pH are shown in FIG. 6.

It can be seen from FIG. 6 that, at all three pH tested, the release profiles can be considered "immediate". Drug release was observed to be faster at lower pH (pH=1.2 and pH=4.6), with approximately 80% release after 6 mins, and substantially complete release after 10 mins. Drug release at pH 6.8 was somewhat slower, with approximately 53% release after 6 mins, and about 70% drug release after 10 mins.

Controlled Release Films Containing Metoclopramide Hydrochloride 10 g Dowex® 50WX8 (50-100 mesh; 149-297 μm), a strong acid cation ion exchange resin with 8% divinylbenzene cross-linking, was dispersed in 100 mL of a 5% (w/v) solution of metoclopramide hydrochloride (BÜFA; Lot No. 13C12-B02) in distilled water, and stirred by magnetic stirrer (250 rpm) for 24 hours. The drug-resin complex was then filtered through a 47 mm 0.2 μm nylon membrane (Phenex™, Phenomenex Inc., Cheshire, UK) and washed with distilled water. The filtrate was diluted and assayed by UV spectrophotometry at 275 nm to indirectly determine the extent of drug loading. The drug-resinate was dried at 60° C. in a cabinet drier.

An oral thin film formulation was developed containing 10 mg metoclopramide hydrochloride loaded within an ion-exchange resin complex (Dowex® 50WX8, 50-100 mesh, prepared as above). A viscous stock mixture was prepared which included 14.0% (w/w) drug-resinate; 18.3% (w/w) pullulan which was included as the film forming polymer; 2.4% (w/w) polyvinyl polypyrrolidone as a disintegrating agent; 0.1% (w/w) glycerol as a plasticiser; 1.1% (w/w) sucralose as a sweetener; 1.0% (w/w) lemon 507940T to give the oral thin film a citrus flavour and aroma; 1.7% (w/w) Sisterna SP70 as an emulsifying agent; and distilled water. All ingredients were weighed on an analytical balance and combined using an Ultra-Turrax homogeniser at 8000 rpm. The films were cast on polymer coated paper using a Micrometer Adjustable Film Applicator to a thickness of 1.4 mm, and dried in a cabinet drier at 40° C. for 20 minutes. Oral thin films were cut to a target weight using a rotary blade.

The oral thin film batch conformed to Pharmacopoeial standards of uniformity as the films were within 10% of the stated target metoclopramide content and mean mass. The average (n=10) drug content (SD) was 10.4(0.3) mg, range 9.9-10.8 mg and the average dosage unit mass was 86.8(4.2) mg, range 81.6-93.1 mg Results of drug release profiles at different pH are shown in FIG. 7.

It can be seen from FIG. 7 that, at both pH tested of 1.2 and 6.8, the release profiles appear typical of "sustained" release formulations. Drug release was observed to be somewhat faster at pH 1.2 than at pH 6.8, with a drug release after 2 hours of approximately 43% at pH 6.8 and about 58% at pH 1.2, and a drug release after 4 hours of approximately 64% at pH 6.8 and about 81% at pH 1.2.

Thin Films Containing Complexed Morphine Sulphate and Non-Complexed Metoclopramide Hydrochloride Dowex 50WX8 (50-100 mesh) was dispersed in a 4% (w/v) morphine sulphate aqueous solution, such that the ratio (by weight) of morphine sulphate to resin was 1:1.5, and stirred by magnetic stirrer for 24 hours, protected from light. The resulting drug-resin complex was filtered, washed twice with deionised water and dried. The filtrate (and washings) was diluted and assayed by UV spectrophotometry at 237 nm to indirectly determine the extent of drug loading.

An orodispersible thin film was produced from a stock mixture which contained 11.1% (w/w) drug-resinate containing morphine sulphate, 5.3% (w/w) metoclopramide hydrochloride, 21.9% (w/w) pullulan, 0.3% (w/w) glycerol, 0.9% (w/w) sucralose, 1.2% (w/w) lemon flavour, and distilled water. The mixture was homogenised by hand and cast onto polymer coated paper using a micrometer adjustable film applicator at a thickness of 1.6 mm. The film was dried at 40° C. for 25 minutes and cut to 30×15 mm using a rotary blade and cutting template.

A random sample of oral thin films (n=10) had an average (SD) mass of 105.4(2.14) mg, range 103.1-108.3 mg, and contained 9.26(0.17) mg, range 9.04-9.49 mg morphine sulphate and 12.78(0.26) mg, range 12.50-13.13 mg metoclopramide hydrochloride respectively.

FIG. 8 shows the release profiles of the combination oral thin films at pH 6.8 (n=6). A rapid immediate release of metoclopramide hydrochloride was achieved with more than 80% drug release within 10-20 minutes. A sustained release of morphine sulphate was observed across the 6 hour period, with 80% release observed within the first 3-4 hours.

Thus, the efficacy of the present films for the combined immediate release of a drug, and the sustained release of a second drug provided in a resinate in the film, has been demonstrated.

Controlled Release Films with Oxycodone Hydrochloride
Preparation of Drug Resinate A strong acid cation ion exchange resin with 8% divinylbenzene cross-linking (Dowex® 50WX8, 50-100 mesh [Sigma Aldrich, UK]) was dispersed in 100 mL of a 4.0% (w/v) solution of oxycodone hydrochloride (kindly donated by Macfarlan Smith, Edinburgh, UK) in distilled water, such that the ratio (by weight) of oxycodone hydrochloride to resin was 1:1.5, and stirred by magnetic stirrer (250 rpm) for 24 hours at room temperature, protected from light. The drug-resin complex was then filtered through a 47 mm 0.2 μm nylon membrane (Phenex™, Phenomenex Inc., Cheshire, UK) and rinsed twice with distilled water. The filtrate was diluted and assayed by UV spectrophotometry at 230 nm to indirectly determine the extent of drug loading onto the exchange resin. The drug-resinate was dried at 50° C. for 12 hours.

Drug release was assessed using Type II dissolution apparatus as described in the British Pharmacopoeia (*British Pharmacopoeia* 2014 Online. Appendix XII B. ANNEX: *Recommendations on Dissolution* Testing [Online]. London, England: The Stationery Office on behalf of the Medicines and Healthcare products Regulatory Agency (MHRA). Available: http://www.pharmacopoeia.co.uk/bp2014/ixbin/bp.cgi?a=display&r=S81px22r4gy&n=2&id=894 [Accessed 6 Oct. 2014]). Dissolution was assessed at 37° C.±2° C. using two media: hydrochloride buffer (pH 1.2) and mixed phosphate buffer (pH 6.8). UV measurements were taken at each time point using a fixed wavelength of 230 nm. Paddles were set at 50 rpm and 900 mL of media were used in each jar. Six repeats were performed for each pH buffer.
Results Analysis of the drug-resinate showed that the resulting dried drug-resin complex had a oxycodone hydrochloride content of 41.6% (w/w).

FIG. 10 shows the release profiles of the oxycodone resinate at pH 1.2 and 6.8 for the 50-100 mesh resin.

40% release from the ion exchange resin was reached at 0.33 and 1.67 hours at pH 1.2 and 6.8 respectively; 60% drug release was achieved at 0.83 and 4 hours.

3) Investigation of the Effect of Mesh Size on Drug Release
Methods 10 g Dowex® 50WX8 (50-100 mesh; 149-297 μm), a strong acid cation ion exchange resin with 8% divinylbenzene cross-linking, was dispersed in 100 mL of a 5% (w/v) solution of metoclopramide hydrochloride in distilled water, and stirred by magnetic stirrer (250 rpm) for 24 hours. The drug-resin complex was then filtered and washed with distilled water. The filtrate was diluted and assayed by UV spectrophotometry using a validated method to indirectly determine the extent of drug loading. The drug-resinate was dried at 60° C. in a cabinet drier.

A second drug-resinate was prepared using a higher mesh size for comparison. Dowex® 50WX8 (200-400 mesh; 37-74 μm) was dispersed in a solution of metoclopramide prepared in distilled water such that the ratio of metoclopramide to resin was 1:3 by weight, and stirred by magnetic stirrer (250 rpm) for 24 hours.

Drug release was assessed using Type II dissolution apparatus as described in the British Pharmacopoeia (*British Pharmacopoeia* 2014 Online. Appendix XII B. ANNEX: *Recommendations on Dissolution Testing* [Online]. London, England: The Stationery Office on behalf of the Medicines and Healthcare products Regulatory Agency (MHRA). Available: http://www.pharmacopoeia.co.uk/bp2014/ixbin/bp.cgi?a=display&r=S81px22r4gy&n=2 &id=894 [Accessed 6 Oct. 2014]). Dissolution was assessed at 37° C.±2° C. using three media: hydrochloride buffer (pH 1.2), acetate buffer (pH 4.6) and mixed phosphate buffer (pH 6.8). UV measurements were taken at each time point using a fixed wavelength of 275 nm. Paddles were set at 50 rpm and 900 mL of media were used in each jar. Six repeats were performed for each pH buffer.
Results
50-100 Mesh Analysis of the filtrate revealed 1.33% recovered metoclopramide; therefore an entrapment efficiency of 70% was achieved with 98.67% drug loading by the ion exchange resin.

FIG. 9 shows the release profiles of the metoclopramide resinate at pH 1.2 and 6.8 for the 50-100 mesh resin.

The resulting dried drug-resin complex had a metoclopramide content of 33.15% (w/w). 50% release from the ion exchange resin was reached at 1.2 and 1.7 hours at pH 1.2 and 6.8 respectively; 80% drug release was achieved at 3.0 and 4.7 hours.

200-400 Mesh

Using Dowex® 50WX8, 200-400 mesh, a similar drug loading of 98.72% was achieved. The resulting drug resinate had a metoclopramide content of 24.8% (w/w). Assessment of metoclopramide release was performed at pH 1.2.

Results comparing release rate at pH 1.2 for the 50-100 mesh resinate and the 200-400 mesh resinate are shown in FIG. 11.

As can be seen from FIG. 11, a sustained but earlier release was observed with the higher mesh size, with 80% release attained after only 1 hour.

As also shown in FIG. 11, a change in the mesh size of the ion exchange resin affected the release rate, with a higher mesh size producing a controlled but earlier release of metoclopramide. Without wishing to be bound by theory, it is believed that this may be due to a surface area effect on exchange kinetics—a greater mesh size (i.e. smaller particle size), resulting in a more rapid diffusion from within the resin (The Dow Chemical Company; 2006; *The advantages of uniform particle sized ion exchange resins* [Online], Edegem, Belgium: The Dow Chemical Company. Available: http://tinyurl.com/q5u4ac3 [Accessed 13 Nov. 2014]). This demonstrates how the release kinetics can be easily manipulated depending on clinical requirements 4) Investigation of the Effect of Different Ion Exchanges on the Release of Melatonin with and without Eudragit RSPO Polymer 1 g Dowex® 50WX8 (50-100 mesh; 149-297 μm [Sigma Aldrich, UK]), a strong acid cation ion exchange resin with 8% divinylbenzene cross-linking, was dispersed in 100 mL of a 0.18% (w/v) solution of melatonin (Alfa Aesar, Lot: 516B032) in distilled water, and stirred by magnetic stirrer (250 rpm) for 24 hours. The drug-resin complex was then filtered and washed with distilled water. The filtrate was diluted and assayed by UV spectrophotometry using a validated method to indirectly determine the extent of drug loading. The drug-resinate was dried at 60° C. in a cabinet drier.

A second drug-resinate was prepared using a strong acid cation sodium polystyrene sulfonate ion exchange resin Amberlite® IRP69 (50-150 μm [Dow Chemical Company]) dispersed in a solution of melatonin prepared in distilled water. The same weight of ion exchange resin and concentration of melatonin solution as for the Dowex resinate, and stirred by magnetic stirrer (250 rpm) for 24 hours.

In addition to the Amberlite® IRP69 drug resinate being prepared alone, a methacrylate copolymer (Eudragit® RSPO [Rohm pharma polymers]) was added to the resinate solution to investigate the influence of the addition of the polymer to the resinate to melatonin release. The same method was used as before for preparation of the Amberlite resinate but 4 g of Eudragit® RSPO was added at the same time. The ion exchange resin, Eudragit RSPO and melatonin solution were stirred by magnetic stirrer (250 rpm) for 24 hours and filtration carried out as previously described.

An oral thin film formulation was developed containing melatonin loaded within an ion-exchange resin complex (Amberlite® IRP69 with Eudragit® RSPO, prepared as above). A viscous stock mixture was prepared which included 22.4% (w/w) drug-resinate with Eudragit® RSPO; 18.7% (w/w) pullulan which was included as the film forming polymer; 1.1% (w/w) polyvinyl polypyrrolidone as a disintegrating agent; 0.1% (w/w) glycerol as a plasticiser; 0.5% (w/w) sucralose as a sweetener; 0.5% (w/w) lemon 507940T to give the oral thin film a citrus flavour and aroma; 0.8% (w/w) Sisterna SP70 as an emulsifying agent; and distilled water. All ingredients were weighed on an analytical balance and combined using an Ultra-Turrax homogeniser at 8000 rpm. The films were cast on polymer coated paper using a Micrometer Adjustable Film Applicator to a thickness of 1.4 mm, and dried in a cabinet drier at 40° C. for 20 minutes. Oral thin films were cut to a target weight using a rotary blade.

Drug release was assessed using Type II dissolution apparatus as described in the British Pharmacopoeia (*British Pharmacopoeia* 2014 *Online. Appendix XII B. ANNEX: Recommendations on Dissolution Testing* [Online]. London, England: The Stationery Office on behalf of the Medicines and Healthcare products Regulatory Agency (MHRA). Available: http://www.pharmacopoeia.co.uk/bp2014/ixbin/bp.cgi?a=display&r=S81px22r4gy&n=2 &id=894 [Accessed 6 Oct. 2014]). Dissolution was assessed at 37° C.±2° C. using two media: hydrochloride buffer (pH 1.2) and mixed phosphate buffer (pH 6.8). UV measurements were taken at each time point using a fixed wavelength of 275 nm. Paddles were set at 50 rpm and 900 mL of media were used in each jar. Six repeats were performed for each pH buffer. Circadin® 2 mg tablets (Flynn Pharma Ltd., Stevenage, UK; Batch No. 60254A) was used as a comparator product and dissolution was performed by the same method.

Results

Dowex 50XW8 50-100 Mesh

It was observed that the melatonin resinate underwent a significant colour change from orange to black grey suggesting an oxidation reaction between the melatonin and Dowex 50XW8 ion exchange resin.

FIG. 12 shows the release profiles of the melatonin resinate at pH 1.2 for the Dowex 50XW8_50-100 mesh resin and Amberlite IRP69 resin with and without Eudragit RSPO compared to Circadin® tablets. 58.33% release from the ion exchange resin was reached at 30 minutes and 89.8% release at 120 minutes.

Amberlite IRP 69

In comparison to the Dowex melatonin resinate there was no significant colour change when the melatonin solution was added to the Amberlite® IRP 69. Assessment of melatonin release was performed at pH 1.2 and is shown in FIG. 12.

As can be seen from FIG. 12, a much faster release of melatonin was observed with 80% release attained after only 10 minutes suggesting Amberlite® IRP 69 ion exchange resin not to be suitable alone for creating a controlled release. This was to be expected due to the Amberlite® IRP69 being presented as a powder which has a higher surface area in comparison to the Dowex 50W8X which comes in a bead form. This was previously highlighted in this document with metoclopramide with the Dowex resins of different mesh size ranges.

Amberlite IRP 69 and Eudragit RSPO

As shown in FIG. 12 when Amberlite® IRP 69 was combined with Eudragit RSPO the rate of release lowered to a similar rate observed with the Dowex 50X8W ion exchange resin with 57.49% release at 30 minutes and 81.4% at 120 minutes.

The reduced rate of release upon addition of Eudragit RSPO to the Amberlite IRP 69 resinate was to be expected due to the well documented use of polymethacrylates like Eudragit RSPO being used for the controlled release of drugs.

Amberlite IRP 69 and Eudragit RSPO Oral Thin Film

Assessment of melatonin release from oral thin films was performed at pH 1.2 and pH 6.8 and compared with Circadin® tablets. FIG. 13 shows the release profiles of the thin film containing the melatonin resinate with Eudragit RSPO compared to the Circadin® tablets at pH 1.2 and pH 6.8.

As shown in FIG. 13 the rate of release of melatonin from the oral thin film, in comparison to the Amberlite® IRP69 resinate in combination with the Eudragit RSPO alone, reduced further to 24% within 30 minutes and 73% within 120 minutes at pH 1.2. This was closer to the release profile of melatonin from Circadin® tablets which showed a release of 20.8% at 30 minutes and 62.3% at 120 minutes. Furthermore at pH 6.8, the oral thin films showed a release of 18% at 30 minutes and 67% at 100 minutes. In addition the Circadin tablets at pH 6.8 showed a release of 25% at 30 minutes and 63.7% at 120 minutes.

The invention claimed is:

1. An orally dissolvable film including at least one layer, wherein a first layer of the at least one layer comprises a non-complexed first pharmaceutically active ingredient that provides an immediate release rate: said first layer of said at least one layer further comprising a resinate comprising an ion exchange resin that provides a controlled and/or delayed release rate for a second pharmaceutically active ingredient, and a matrix and/or binder, wherein the immediate release rate is selected from the group consisting of at least a 30% release of said first pharmaceutically active ingredient and at least a 50% release of said first pharmaceutically active ingredient, during the first 5 minutes, when measured at pH 6.8, and wherein the controlled and/or delayed release rate is selected from the group consisting of about a 5-80% release of the second pharmaceutically active ingredient and about a 10-60% release of the second pharmaceutically active ingredient, after 1 hour, when measured at pH 6.8.

2. The film according to claim 1, wherein the first pharmaceutically active ingredient and/or the resinate is incorporated within the layer of the film.

3. The film according to claim 1, wherein the first pharmaceutically active ingredient is provided in the layer in an amount of about 0.1-50 wt. % based upon the total weight of the film.

4. The film according to claim 1, wherein the resinate is provided in the one layer in an amount of about 1-50 wt. % based upon the total weight of the film.

5. The film according to claim 1, wherein the weight ratio of the second pharmaceutically active ingredient to the ion exchange resin in the resinate is about 2:1 to 1:5.

6. The film according to claim 1, wherein the immediate release rate is selected from the group consisting of at least a 50% release of the first pharmaceutically active ingredient and at least a 60% release of said first pharmaceutically active ingredient, during the first 5 minutes, when measured at pH 1.2.

7. The film according to claim 1, wherein the controlled and/or delayed release rate is selected from the group consisting of about a 10-80% release of the second pharmaceutically active ingredient and about a 20-60% release of the second pharmaceutically active ingredient, after 1 hour, when measured at pH 1.2.

8. The film according to claim 1, wherein the ion exchange resin is provided in the form of beads having an associated particle size and/or or associated mesh size, the mesh size and/or particle size of the ion exchange resin or a mixture of ion exchange resins being selected to provide a desired rate of release of the active ingredient or drug.

9. The film according to claim 8, wherein the associated mesh size is in the region of 50-100 mesh- and/or the associated particle size is in the region of 150-300 μm.

10. The film according to claim 8, wherein the associated mesh size is in the region of 100-200 mesh and/or the associated particle size is in the region of 74-150 μm.

11. The film according to claim 8, wherein the associated mesh size is in the region of 200-400 mesh and/or the associated particle size is in the region of 37-74 μm.

12. The film according to claim 1, wherein the ion-exchange resin and/or resinate is provided in the form of particles coated and/or encapsulated within a processing material selected so as to withstand degradation or dissolution within one or more areas of the digestive system, and degrade or dissolve in one or more other areas of the digestive system.

13. The film according to claim 1, wherein the ion exchange resin comprises a free or unloaded ion exchange resin.

14. The film of claim 1, wherein the first pharmaceutically active ingredient and the second pharmaceutically active ingredient are the same.

15. The film of claim 1, wherein the first pharmaceutically active ingredient and the second pharmaceutically active ingredient are different.

16. The film according to claim 1, wherein said film is prepared by casting on a support.

17. The film according to claim 1, wherein said first pharmaceutically active ingredient is applied to the surface of the layer.

18. The film according to claim 2, wherein said incorporated first pharmaceutically active ingredient is absorbed, dispersed or dissolved within the layer.

19. The film according to claim 17, wherein said applied first pharmaceutically active ingredient is imprinted, coated or spread on the surface of the layer.

* * * * *